United States Patent [19]

Spiesberger

[11] Patent Number: 6,160,758
[45] Date of Patent: *Dec. 12, 2000

[54] UTILIZATION OF AUTO AND CROSS-CORRELATION FUNCTIONS IN METHODS FOR LOCATING A SOURCE OF A PRIMARY SIGNAL AND FOR LOCALIZING SIGNALS

[75] Inventor: John L. Spiesberger, Port Matilda, Pa.

[73] Assignee: Scientific Innovations, Inc., Radnor, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,605

[22] Filed: Jun. 27, 1997

Related U.S. Application Data

[60] Provisional application No. 60/020,873, Jun. 28, 1996, and provisional application No. 60/040,168, Mar. 11, 1997.

[51] Int. Cl.[7] .................................................. G01S 3/80
[52] U.S. Cl. ........................ 367/125; 367/127; 342/378
[58] Field of Search ................................... 367/124, 125, 367/127; 342/378

[56] References Cited

U.S. PATENT DOCUMENTS

| | | | |
|---|---|---|---|
| 3,603,922 | 9/1971 | Hair, Jr. et al. | 367/125 |
| 3,978,445 | 8/1976 | Gravett | 367/125 |
| 4,041,293 | 8/1977 | Kihlberg | 367/89 |
| 4,198,704 | 4/1980 | Munson | 367/125 |

OTHER PUBLICATIONS

Hellstron, "Statistical Theory of Signal Detection," Pergamon Press, New York, pp. 274–276 (1968).

Watkins et al., "Four Hydrophone Array For Acoustic Three–Dimensional Location," Wood, Hole Oceangr. Inst. Tech. Rep., Woods Hole, MA, Ref. No. 71–60 pp. 1–33, Figs. 1–14, App. 1–22 (1971).

Spiesberger et al., "Passive Localization of Calling Animals and Sensing of Their Acoustic Environment Using Acoustic Tomography," *The American Naturalist*, 135:107–153 (1990).

Spiesberger, "Locating Animals From Their Sounds and Tomography of the Atmosphere: Experimental Demonstration," *J. Acoust. Soc. Am.*, 106:1–10 (1999).

Spiesberger, "Identifying Cross–Correlation Peaks Due to Multipaths With Application to Optimal Passive Localization of Transient Signals and Tomographic Mapping of the Environment," *J. Acoust. Soc. Am.*, 100:910–17 (1996).

Bell et al., "Separating Multipaths By Global Optimization of Multidimensional Matched Filter," *IEEE Transactions on Acoustics, Speech and Signal Processing*, 34:1029–37 (1986).

Vaccaro et al., "Time–Delay Estimation for Deterministic Transient Signals in a Multipath Environment," *IEEE International Conference on Acoustics, Speech and Single Processing*, ICASSP092, 2:549–52 (1992).

Manickam et al., "A Least–Sqaures Algorithm for Multipath Time–Delay Estimation," *IEEE Transactions on Signal Processing*, 42:3229–33 (1994).

Baggeroer, "Matched Field Processing: Source Localization in Waveguides," in Conference Record of the Twenty–Sixth Asilomar Conference on Signals, Systems and Computers, Pacific Grove, CA, Ed., A. Signh, *IEEE Comput. Soc. Press*, 2:1122–6 (1992).

(List continued on next page.)

*Primary Examiner*—Ian J. Lobo

[57] ABSTRACT

A method of localizing signals utilizing auto-correlation functions and cross correlation functions includes: collecting data at a plurality of input channels; filtering the data collected from the plurality of input channels in order to identify a primary signal; identifying at least two lags and at least one reference lag in a function of the data; and estimating relative travel times of the data.

12 Claims, 18 Drawing Sheets

OTHER PUBLICATIONS

Fradkin, "Identification of the Acoustic Ocean Transfer Function in the Tyrrhenian Sea. I: Statistical Considerations," *J. Acous. Soc. Am.*, 87:1569–76 (1990).

Vaccaro et al., "Time Delay Estimation for Ocean Acoustic Transient Signal Extraction in a Multipath Environment," *International Conference on Acoustics, Speech and Signal Processing*, 5:2923–6 (1990).

Spiesberger, et al., "Stability and Identification of Ocean Acoustic Multipaths," *J. Acoust. Soc. Am.*, 67:2011–17 (1980).

Carter, "Coherence and Time Delay Estimation: An Applied Tutorial for Research Development, Test, and Evaluation Engineers," Ed. G. Clifford Carter, Piscataway, NJ, *IEEE Press*, pp. 1–27 (1993).

Vaccaro et al., "Least–Squares Time–Delay Estimation for Transient Signals in a Multipath Environment," *J. Acoust. Soc. Am.*, 92:210–18 (1992).

Claerbout, "Fundamentals of Geophysical Data Processing," McGraw–Hill, NY, pp. 59–62 (1976).

Premus, et al., "Can Acoustic Multipath Explain Finback, (*B. Physalu*) 20–Hz Doublets in Shallow Water?," *J. Acoust. Soc. Am.*, 101:1127–38 (1997).

Spiesberger, "Passive Acoustic Localization Enhanced with Tomography and Acoustic Thermometry in the Ocean," *J. Mar. Fresh. Behav. Physiol.*, 30:147–72 (1996).

Knapp et al., "The Generalized Correlation Method for Estimation of Time Delay," *IEEE Trans. Acoust., Speech, Signal Processing*, 24:320–27 (1976).

Li et al., "Arrival Time Estimation Using Iterative Signal Reconstruction from the Phase of the Cross–Spectrum," Reprint from *Proc. Of the 2$^{nd}$ International Symposium on Computer–Aided Seismic Analysis and Discrimination*, pp. 87–91 (1981).

Ianniello, "Time Delay Estimation Via Cross–Correlation in the Presence of Large Estimation Errors," Reprinted from *IEEE Trans. Acoust. Speech, Signal Processing*, 30:998–1003 (1982).

Wuu et al., "On Time Delay Estimation Involving Received Signals," Reprinted from *Proc. ICASSP '83*, 2:871–74 (1983).

Dianat et al., "A Finite Step Adaptive Technique For Time–Delay Estimation," Reprinted from *Proc. Acoust., Speech, and Signal Processing Spectrum Estimation Workshop II*, pp. 67–69 (1983).

Al–Hussaini et al., "Robust Eckart Filters for Time Delay Estimation," Reprinted from *IEEE Trans. Acoust., Speech, Signal Processing*, 32:1052–63 (1984).

Hero, et al., "A New Generalized Cross Correlator," Reprinted from *IEEE Trans. Acoust., Speech, Signal Processing*, 33:38–45 (1985).

Fertner, et al., "Comparison of Various Time Delay Estimation Methods by Computer Simulation," Reprinted from *IEEE Trans. Acoust. Speech, Signal Processing*, 34:1329–1330 (1986).

Petropulu, et al., "Cumulant Cepstrum of FM Signals and High–Resolution Time Delay Estimation," Reprinted from *Proc. ICASSP '88*, 5:2642–45 (1988).

Ferguson, "Improved Time–Delay Estimates of Underwater Acoustic Signals Using Beamforming and Prefiltering Techniques," Reprinted from *IEEE J. Oceanic Eng.*, 14:238–44 (1989).

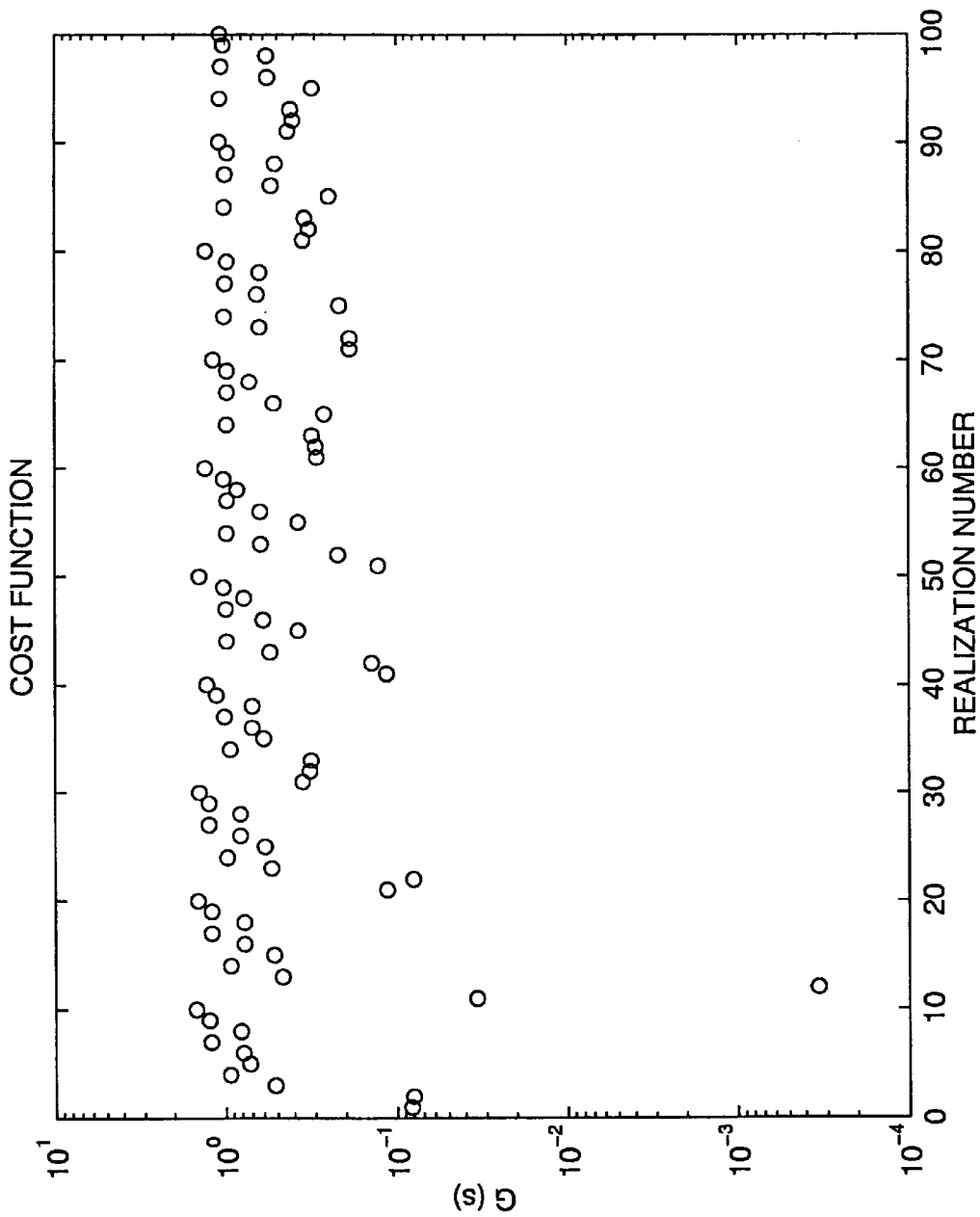

UTILIZATION OF AUTO AND CROSS-CORRELATION FUNCTIONS IN METHODS FOR LOCATING A SOURCE OF A PRIMARY SIGNAL AND FOR LOCALIZING SIGNALS

RELATED APPLICATIONS

The present application claims priority from my previous Provisional Application Ser. Nos. 60/020,873 and 60/040,168 respectively filed Jun. 28, 1996 and Mar. 11, 1997. The benefit of the filing dates of these previous applications is hereby claimed.

BACKGROUND OF THE INVENTION

I. Field of the Invention

In general, the present invention relates to auto-correlation and cross-correlation functions, and more particularly to the utilization of auto-correlation and cross-correlation functions in a method for locating a source of a primary signal and in a method of localizing signals. The invention also relates to the field of tomography and the acoustical mapping of boundaries.

II. Description of the Related Art

Passive acoustic localization of calling animals is more accurate when a tomographic estimation is made of the sound speed and wind fields (Helstrom, *Statistical Theory of Signal Detection*, Pergamon Press, New York, pp. 470, 1968; Watkins et al., Woods Hole Oceanogr. Inst. Tech. Rep., 71–60, Woods Hole, Mass., 1971). Localization and estimation of the environmental fields are made from estimates of the arrival time differences of sound at widely-separated receivers. Cross-correlation is a standard method for optimally estimating the arrival time difference of a signal between a pair of receivers. Under the condition that one signal arrives at each of two receivers, the maximum peak in the cross-correlation function has a signal-to-noise ratio that is about $10 \log_{10} K$ decibels greater than that in the received data records, where K is the time-bandwidth product of the animal's call (Helstrom, 1968). Thus cross-correlation may significantly increase the range over which animals may be detected and localized (Helstrom, 1968). However, if there are echoes and reflections which reach the receiver along with the direct path, there are many peaks in the cross-correlation function (FIG. 1). Which peak is chosen if the cross-correlations between the echoes and reflections are similar to or greater than from the direct path? In many terrestrial and shallow water environments with imprecisely known boundaries, the first arrival, which may be nearly straight, may be the only useful path for localization since the geometry of the other paths originating from echoes may be difficult to estimate. Cross-correlation does not tell us which peak to choose. For example, suppose there are three multipaths arriving at each receiver. Each cross-correlation between two receivers will have up to 3×3=9 peaks. If five receivers are used for localization, there are four independent cross-correlations that can be formed (Helstrom, 1968). One localization technique requires estimating which of the $9^4$=6561 sets of four arrival time differences is correct (Helstrom, 1968). This is the dilemma I faced five years ago when attempting to localize birds in a North Falmouth forest in Massachusetts. The first arrivals were not always the loudest, and there were many multipath at each receiver. In the few cases where the cross-correlation peak was correctly identified as the difference in the first arrivals, localization could be done and a tomographic estimate of the sound speed and wind field could be made (Watkins et al., 1971). In most other cases, neither localization nor tomographic estimation of the environment was feasible because I could not identify the desired peak in the cross-correlation function.

To address this conundrum, I derive a new method which identifies the cross-correlation peak corresponding to the difference in arrival time between the first arrivals at each receiver in the presence of echoes (Sec. I). Its numerical implementation is efficient. The method does not give up the tremendous gain in signal-to-noise ratio achieved with cross-correlation.

The key to unlocking the multipath problem with cross-correlation is to consider the extra information residing in the reception's auto-correlation functions. They often provide enough information to identify the relative arrival times of all the multipaths at each receiver and between receivers (Sec. II). Estimating these relative arrival times is less efficient than estimating the difference in arrival times of the first arrivals.

Solution At Large Signal-To-Noise Ratios

Estimating the arrival times of multipaths at a receiver has been investigated by many (Spiesberger et al., The American Naturalist, 135, 107–153; 1990; Spiesberger, in preparation, 1997; Spiesberger, J. Acoust. Soc. Am., 100, 910–917, 1996; Bell et al., IEEE Transactions on Acoustics, Speech and Signal Processing, 34, 1029–1037, 1986; Vaccaro et al., IEEE International conference on Acoustics, Speech and Signal Processing, ICASSP092, 2, 549–552, 1992; Manickam et al., IEEE Transactions on Signal Processing, 42, 3229–3233, 1994; Baggeroer, in Conference Record of the Twenty-Sixth Asilomar Conference on Signals, Systems and Computers, Pacific Grove, Calif. Ed., A. Singh, IEEE Comput. Soc. Press, 2, 1122–1126, 1992; Fradkin, J. Acoust. Soc. Am., 87, 1569–1576, 1990; Vaccaro et al., International Conference on Acoustics, Speech and Signal Processing, 5, 2923–2926, 1990). To the best of my knowledge, there is no previously published method for estimating the relative travel-times when all of the following six conditions are true: 1) the number of multipaths is unknown, 2) the received signal-to-noise ratio is so low that the multipath cannot be discerned above the noise, 3) the transmission time is unknown, 4) the transmitted waveform is unknown, 5) the spatial coordinates of the multipaths are impractical to measure or estimate, and 6) the differential Doppler between multipaths at each receiver is sufficiently small so as to not reduce an otherwise significant peak in an auto-correlation function to a level indistinguishable from noise. The method described here may work under these six conditions as long as the peaks in the auto and cross-correlation functions have high signal-to-noise ratios and the received time-series are pre-filtered to remove all signals except those from a single source.

Solution At Low Signal-To-Noise Ratios

As previously stated, Cross-correlation is a standard method for estimating the travel-time difference of a signal at two locations (Helstrom, 1968). This difference may be used to estimate the location of the source using hyperbolic techniques if the paths are approximately straight (Watkins et al. 1971; Spiesberger et al., 1990). When attempting to localize birds from a set of widely-separated microphones, there are typically many paths, called multipaths, reaching each receiver (Spiesberger, 1997). If there are four multipaths at one receiver and three at another, the cross-correlation function contains up to 3×4=12 peaks (FIG. 1). The largest of these does not always correspond to the difference in travel-time between the first arrivals (Spiesberger, 1997). Cross-correlation then fails to identify a peak which is useful for localizing the bird, since the geometries of the other paths may be uncertain because they reflect from boundaries such as rough terrain or trees whose positions are typically not measured. However, when the signal-to-noise ratios of four particular peaks among the auto and cross-correlation functions are high, the information in auto-correlation functions is useful for identifying the peak in the cross-correlation function which corresponds to the difference in travel-time of the first arrivals (Spiesberger, 1996). If these four peaks have a low or negative signal-to-noise ratio, that method may fail to identify the desired peak. The principal purpose of this paper is to generalize the method given in Spiesberger (1996) so that the desired peak may be identified even when the signal-to-noise ratios of the signal-related peaks in auto and cross-correlation functions are distributed from moderate to negative values.

Spiesberger (1996) considers a case where the signal from a single source is recorded on two channels. The peak in the cross-correlation function which corresponds to the difference in travel-time between the first arrivals is identified using two equations which relate four lags in the auto and cross-correlation functions. I find here that auto-correlation functions contain much more information than expressed by these two equations. Considering the signals collected at two or more receivers, it is possible to express the information in terms of new "correlation equations" that connect the information between the lags and amplitudes of peaks in auto and cross-correlation functions. The equations are used to estimate the numbers, relative travel-times, and amplitudes of the multipaths at and between the receivers. These principles are demonstrated by simulating signals collected at many receivers. They also yield the correct answers with signals collected from birds (Spiesberger, 1997).

The number of new equations which relate lags in correlation functions can be large for experimental conditions, for example $10^3$. A global solution for the relative travel times may be impractical to implement. For an experiment I conducted, a global solution would require forming about $10^{33}$ realizations of lags to insert into the lag-equations. Instead, it is critical to use practical methods for finding solutions, even if these solutions may not be the same as the global solution. A new function is introduced that facilitates the convergence to a solution.

There are three benefits in using auto-correlation functions to identify peaks in cross-correlation functions. First, like cross-correlation functions, auto-correlation functions provide a gain in the received signal-to-noise ratio if the time-bandwidth product of the signal is larger than O(1) (Spiesberger et al., 1990). Second, the temporal resolution of the signal is compressed to its inverse bandwidth in both the auto and cross-correlation functions, thus allowing for a temporal discrimination that may not be evident at the receiver (Helstrom, 1968). Third, all the required data are at hand to compute auto-correlation functions when computing cross-correlation functions. Thus, the methods given here do not compromise the well-known benefits associated with cross-correlating signals.

Estimating the arrival times of multipaths at a receiver has been investigated by many (Bell et al., 1986; Vaccaro et al., 1992; Manickam et al., 1994; Baggeroer, 1992; Fradkin, 1990; Spiesberger et al., J. Acoust. Soc. Am., 67, 2011–2017, 1980; Carter *Coherence and Time Delay Estimation: An Applied Tutorial for Research, Development, Test, and Evaluation Engineers,* Ed. G. Clifford Carter, Piscataway, N.J. IEEE Press, pp. 506, 1993; Vaccaro et al, J. Acoust. Soc. Am., 92, 210–218, 1992). To the best of my knowledge, there is no previously puslished method, except for Spiesberger (1996), for estimating the relative travel-times when all of the following six conditions are true: 1) The number of multipaths are unknown, 2) the received signal-to-noise ratios are so low that the multipaths cannot be discerned above the noise, 3) the transmission time is unknown, 4) the transmitted waveform is unknown, 5) the spatial coordinates of the multipaths are impractical to measure or estimate, and 6) the differential Dopper between mutlipaths at each receiver is sufficiently small as to not reduce an otherwise significant peak in an auto-correlation function to a level indistinguishable from noise. The method described here may work under these six conditions as long as some of the peaks in the auto and cross-correlation functions have positive signal-to-noise ratios and the received time-series are pre-filtered to suppress all signals except those from a single source.

Preliminary assumptions and definitions are presented in Sec. I. Sec. II presents a method for counting the number of multipaths from the information in auto and cross-correlation functions. The correlation equations are introduced in Secs. III and IV. A method for implementing the equations is presented in Sec. V. A demonstration of the technique is presented through the use of a simulation in Sec. VI. The results are discussed in Sec. VII.

SUMMARY OF THE INVENTION

Based upon the above-identified problems with respect to the related art, it is therefore an object of the present invention to provide a method of utilizing auto-correlation and cross-correlation functions in order to locate a source of a primary signal.

Another object of the present invention is to provide a method of utilizing auto-correlation and cross-correlation functions in order to localize signals.

In a principal aspect, then, the method of localizing signals of the present invention comprise the steps of: collecting multipath signals at a plurality of input channels; filtering said multipath signals collected from said plurality of input channels in order to identify a primary signal; utilizing auto-correlation functions and a cross-correlation function of said multipath signals in order to identify a plurality of lags; identifying a reference lag in said auto-correlation function and said cross-correlation function of said multipath signals; estimating a total number of multipath signals received in said plurality of input channels, and estimating relative travel times and amplitudes of said multipath signals.

In a principal aspect, the method of locating a source of a primary signal of the present invention comprises the steps of: collecting multipath signals at a plurality of input channels; filtering said multipath signals collected from said plurality of input channels in order to identify said primary signal; estimating a total quantity of said multipath signals collected from each of said plurality of input channels; identifying a plurality of reference lags in said multipath signals; estimating amplitudes and relative travel times of said primary signal to each of said plurality of input channels; selecting a primary reference lag from said plurality of reference lags; and estimating errors in said relative travel times based upon said primary reference lag.

These as well as other novel advantages, details, embodiments, features and objects of the present invention will be apparent to those skilled in the art from the following detailed description of the invention, the attached claims and accompanying drawings, listed hereinbelow, which are useful in explaining the invention.

BRIEF DESCRIPTION OF THE DRAWINGS

In the text which follows and in the drawings, wherein similar reference numerals denote similar elements throughout the several views thereof, the present invention is explained with reference to illustrate embodiments, in which:

FIG. 10 depicts the cost function for 100 realizations of the peak lags in the cross-correlation function.

Figure 1:
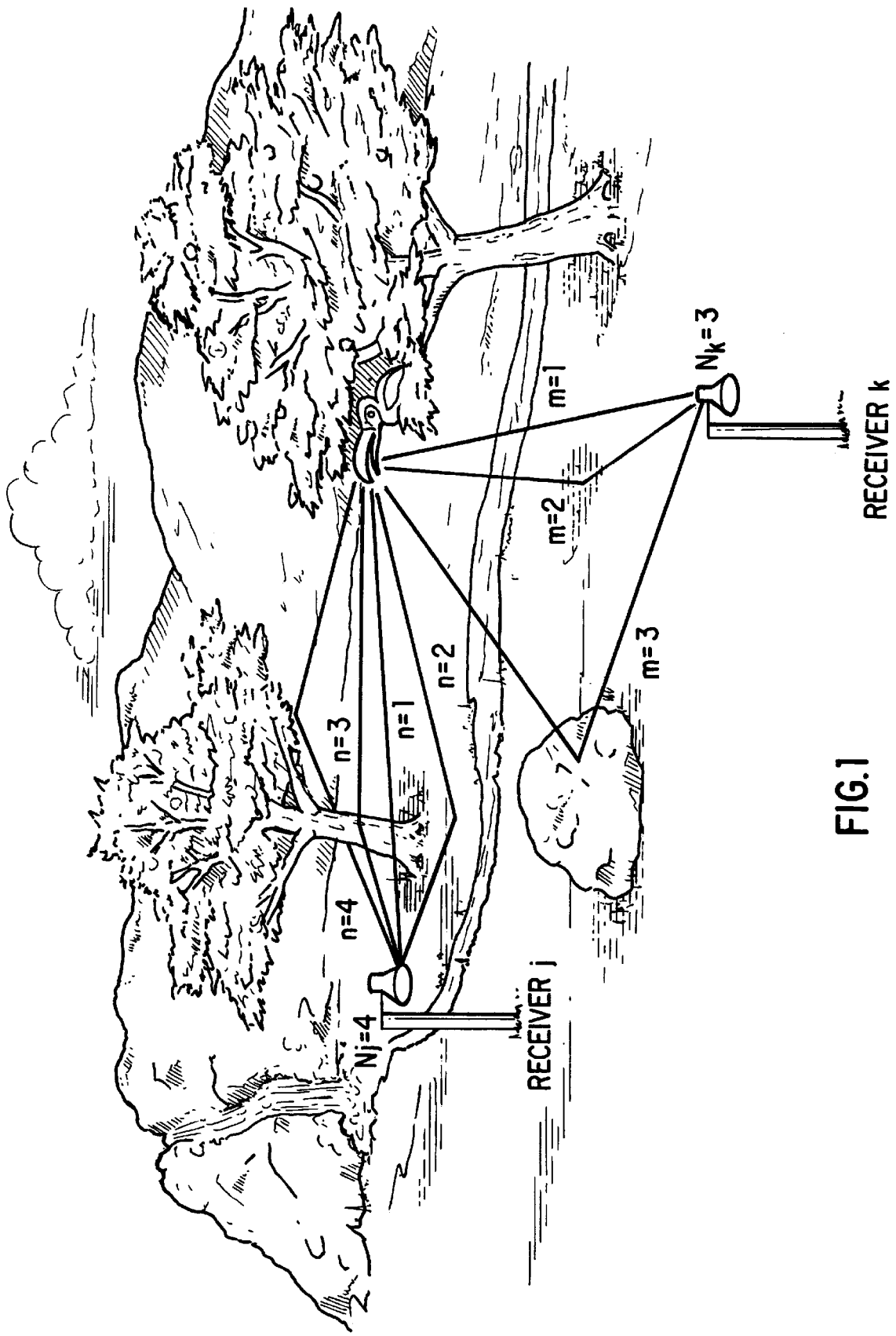
FIG. 1 is a view of $N_j=4$ and $N_k=3$ acoustic paths between a Toucan and receivers j and k respectively. The direct paths are n=1 and m=1. The other paths reflect from the ground, a rock, and a cliff. Adapted from Spiesberger (1996).
Figure 2A:
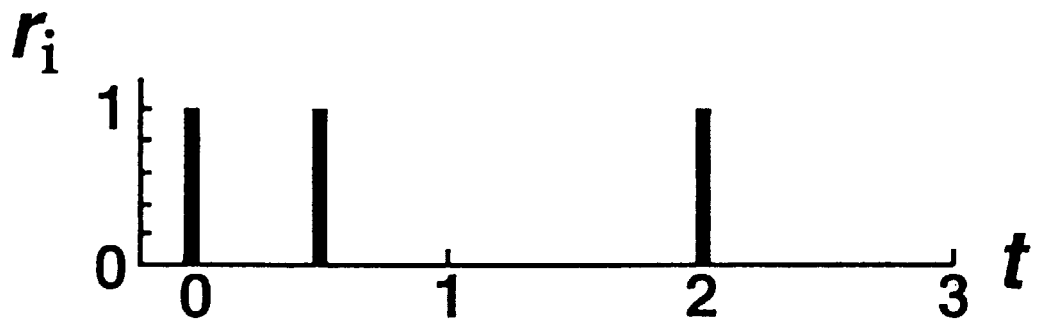
FIG. 2 are the simulated travel-times of multipaths at receivers i and j. They are $t_i[1]$, $t_i[2]$, and $t_i[3]=0$, 0.5, and 2 s respectively and $t_j[1]$, $t_j[2]$, and $t_j[3]=0.6$, 0.7, and 1.5 s respectively (upper left-hand panels). Only peaks with non-negative lags in the auto-correlation functions (ACFs) are shown (upper right-hand panels). The cross-correlation (CCF), defined by Eq. ( 2), has peaks whose lags have patterns which replicate the relative travel-times at receiver i. The number of replicates is the number of arrivals at receiver j. The $F_{ij}(T)$ and $B_{ij}(T)$-augmented template correlation functions, defined by Eqs. (24) and (25), tend to have large values at relative travel-times equal to those at receivers j and i respectively. In this example, the most negative lag of the largest three peaks in each of $F_{ij}(T)$ and $B_{ij}(T)$ occurs at lags $-\tau_{ij}[1, 1]$ and $\tau_{ij}[1, 1]$ respectively (Tau is the Greek letter $\tau$). Note from the upper left-two panels that $\tau_{ij}[1, 1]=-0.6$ s.
Figure 2B:
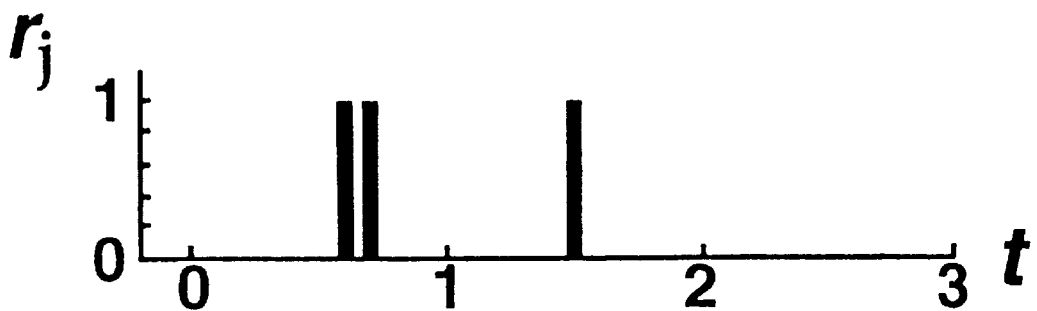
Figure 2C:
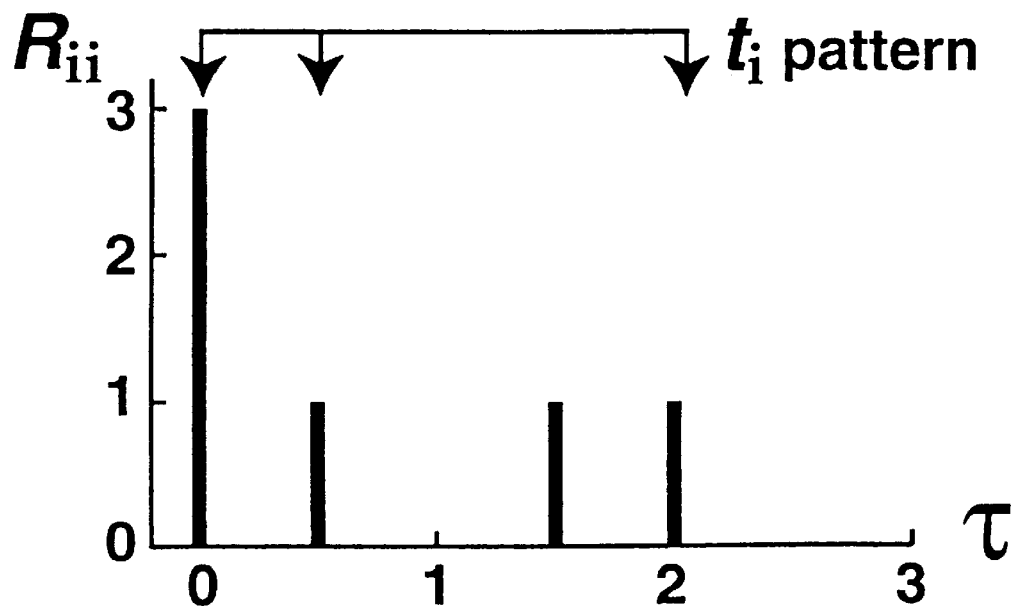
Figure 2D:
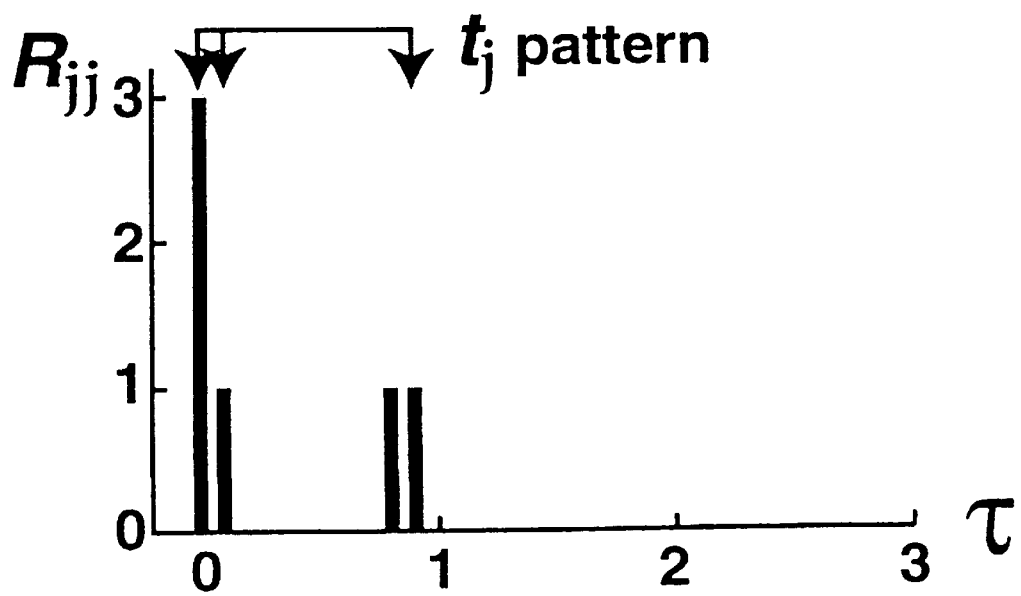
Figure 2E:
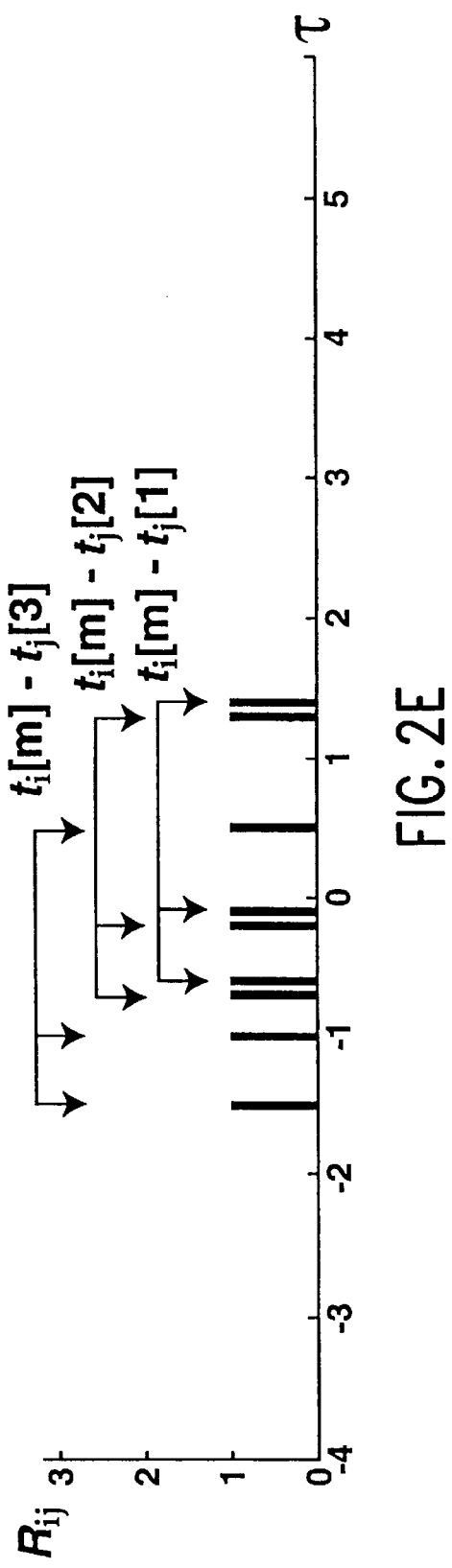
Figure 2F:
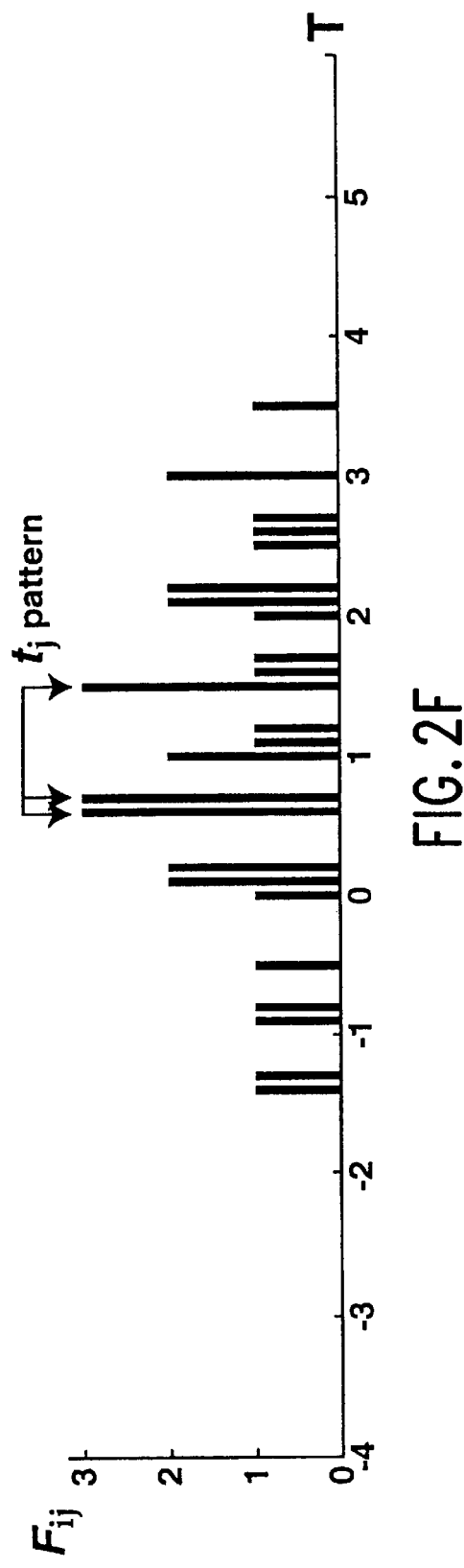
Figure 2G:
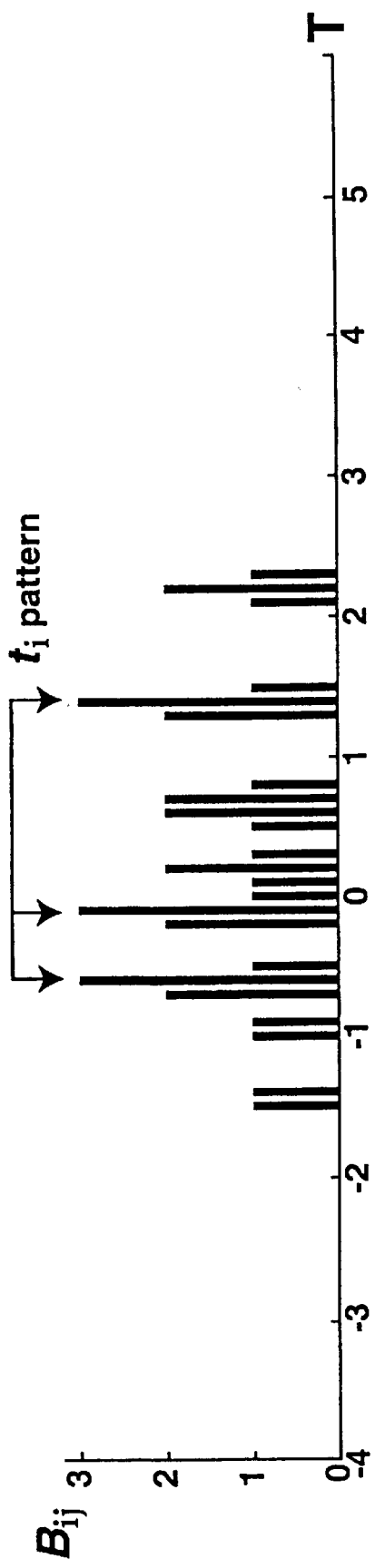

Table I displays the Cartesian coordinates of the five receivers used for the simulation in FIGS. 3, 4, 5, and 6.

Table II displays the travel times, Tau i (s) and amplitudes, $a_i$, of ten multipaths at each of the five receivers.

Table III displays the number of peaks selected from the indicated correlation pairs.

Table IV displays the maximum number of peaks in the autocorrelation function, $P_j$, versus the number of multipaths arriving.

Table V displays the number of multipaths and arrival time degeneracies estimated using equation 30.

Table VI displays the total number of realizations, Tau jk from (37), of positively lagged peaks in the ACF's of channels j and k that may be constructed to find the best fit to the peak's lags in the CCF.

Table VII displays the arrival times and amplitudes of the four multipaths at channels j and k for FIGS. 7, 8, 9, and 10.

Table VIII displays the lags of peaks in the cross-correlation function from channels j and k.

Table IX displays the lags of peaks in the autocorrelation functions (ACF).

Table X is a reconstruction of the relative arrival times of the four multipaths in channels j and k.

DESCRIPTION OF THE PREFERRED EMBODIMENTS

For a better understanding of the present invention, reference may be had to the following detailed description taken in conjunction with the appended claims and accompanying drawings. This part of the disclosure is applicable to data which may have low signal-to-noise ratios in the correlation functions.

I. PRELIMINARIES

Following Spiesberger (1996), a signal, s(t), is emitted at time t=0. There are $N_j$ multipaths reaching receiver j at time intervals exceeding $\Delta f^{-1}$ where the bandwidth of the signal is $\Delta f$. Multipaths arriving at intervals less than $\Delta f^{-1}$ are counted as one arrival. The signal arriving at receiver j is assumed to have the form, $$r_j(t) = \sum_{n=1}^{N_j} a_j[n]s(t-t_j[n]) + e_j(t), \qquad (1)$$

where the amplitude and travel-time of the nth multipath are $a_j[n]$ and $t_j[n]$ respectively. The noise is $e_j(t)$. The auto and cross-correlations are defined as, $$R_{ij}(\tau) \equiv \int r_i(t)r_j(t-\tau)dt, \qquad (2)$$

where i=j for auto-correlations and i≠j for cross-correlations.

II. COUNTING MULTIPATHS

Let there be R receivers numbered from 1 to R. Let the number of positively-lagged peaks in the auto-correlation function of channel i be denoted $P'_i$. Eq. (30) in Spiesberger et al. (1990) can be rewritten to specify a lower bound for the number of multipaths in channel i as, $$\tilde{N}_i \geq \left\lceil \frac{1 + \sqrt{1 + 8P'_i}}{2} \right\rceil; i = 1, 2, \cdots \mathcal{R}, \quad (3)$$

where $\tilde{N}_i$ is the estimated number of multipaths and $\lceil \chi \rceil$ is the ceiling function denoting the least integer greater than or equal to $\chi$. Cross-correlation functions provide further constraints on the number of multipaths at each receiver. If $M'_{ij}$ denotes the number of resolved peaks in the cross-correlation function, the additional constraint is, $$\tilde{N}_i \tilde{N}_j \geq M'_{ij}; i \neq j, \quad (4)$$

(Eq. (31) in Spiesberger et al., 1990). A solution for the number of multipaths may be obtained by minimizing the total number of multipaths, $$C_1 \equiv \sum_{i=1}^{\mathcal{R}} \tilde{N}_i, \quad (5)$$

subject to Eqs. (3) and (4).

III. CORRELATION EQUATIONS: LAGS

A. Lags in Auto and Cross-correlation Functions

Let, $$\tau_{ij}[m, n] \equiv t_i[m] - t_j[n]; i \leq j; i \text{ and } j = 1, 2, 3, \ldots R \quad (6)$$

denote the lags at which peaks occur in the auto and cross-correlation functions of channels i with j. The "reference-lag" is defined to be the difference in travel-time between the first arrivals at two receivers. Eqs. (25–6) in Spiesberger (1996) provide two independent estimates for the reference-lags given by, $$\tau_{ij}[1, 1] = \tau_{ij}[1, N_j] + \tau_{jj}[N_j, 1], \quad (7)$$

$$\tau_{ij}[1, 1] = \tau_{ij}[N_i, 1] - \tau_{ii}[N_i, 1]. \quad (8)$$

These equations may be implemented by inspection when the signal-to-noise ratios of four peaks are high. The most negatively and positively-lagged peaks in the cross-correlation function are $\tau_{ij}[1, N_j]$ and $\tau_{ij}[N_i, 1]$ respectively. $\tau_{ii}[N_i, 1]$ and $\tau_{jj}[N_j, 1]$ are the most positively-lagged peaks in the auto-correlation functions of channels i and j respectively. The two equations provide independent estimates of the reference-lag, $\tau_{ij}[1, 1]$. However, if the signal-to-noise ratios of the peaks at these four lags cannot be unambiguously identified from the noise, this method may fail.

A new set of lag-equations that can be formed from auto and cross-correlation functions is, $$\tau_{ij}[q, 1] = \tau_{ij}[q, n] - \tau_{ij}[1, n]; i \neq j, \quad (9)$$

where, i=1, 2, 3, . . . R j=1, 2, 3, . . . R n=1, 2, 3, . . . $N_j$; for i<j n=1; for i>j q=2, 3, . . . $N_i$ This set is exact if there is 1) no noise, 2) no interference between multipaths leading to a correlation peak being shifted in lag-space, and 3) no lack of coherence between multipaths in the auto and cross-correlation functions. To the best of my knowledge, these lag-equations have not previously been considered, except for the subset expressed by Eqs. (7) and (8).

1. Interpretation

For channels i and j, the peaks in the cross-correlation function occur at lags, $$\tau_{ij}[m, n] = t_i[m] - t_j[n].$$

The pattern of relative travel-times, $$t_i[m] - t_i[1]; m=2, 3, 4, \ldots N_i, \quad (10)$$

appears $N_j$ times in $R_{ji}(\tau)$, once for each $t_j[n]$ (FIG. 2). These are the patterns expressed by Eq. (9). For each i on the left-hand side of Eq. (9), there are R−1 different j's with attendant R−1 different cross-correlation functions which yield the pattern of relative travel-times in Eq. (10).

Similarly, the pattern of relative travel-times, $$t_j[n] - t_j[1]; n=2, 3, 4, \ldots N_j,$$

appears in $R_{ji}(\tau)$ $N_i$ times, once for each $t_i[m]$.

2. Number of Lag-equations

The number of lag-equations in (9) equals, $$I = \sum_{j=2}^{\mathcal{R}} N_j \sum_{i=1}^{j-1} N_i - \frac{1}{2}(\mathcal{R}^2 - \mathcal{R}) \quad (11)$$

(Appendix A). When the numbers of multipaths in each channel are the same, $$I = \frac{1}{2}(R^2 N^2 - RN^2 - R^2 + R); N_i = N, \forall i, \quad (12)$$

where the symbol, $\forall$, means "for all." At highest order, the number of lag-equations is proportional to the square of the number of multipaths times the square of the number of receivers.

IV. CORRELATION EQUATIONS: AMPLITUDES

The amplitudes of some peaks in the correlation functions contain information that may be used for identification purposes. To avoid interference effects, peaks are only utilized if they are derived from a single pair of multipaths. For example, if there is a peak at lag $\tau_{ij}$, then its amplitude information is only used if there is only one m and n satisfying $\tau_{ij} = \tau_{ij}[m, n]$. Such peaks will be called nondegenerate. Otherwise, they are called degenerate. As will be seen in Sec. V, the lag-equations introduced in Sec. III may be used to identify the nondegenerate peaks.

The amplitude of the nondegenerate peak at lag $\tau_{ij}[m, n]$ is obtained by substituting Eq. (1) into Eq. (2), $$R_{ij}(\tau_{ij}[m, n]) = a_i[m]a_j[n] \int s^2(t)dt + N_{ij}(\tau_{ij}[m, n]), \quad (13)$$

where $N_{ij}(\tau_{ij}[m, n])$ denotes that component of the peak due to noise. For simplicity, we assume the noise component to be negligible, but this assumption is not necessary to make in general. Define, $$b_j[n] \equiv a_j[n] E^{1/2}, \quad (14)$$

where, $$E \equiv \int s^2(t)dt. \quad (15)$$

Eq. (13) reduces to, $$R_{ij}(\tau_{ij}[m, n]) = b_i[m]b_j[n]. \quad (16)$$

The goal is to estimate the amplitudes, $b_i[m]$ and $b_j[n]$, given measured amplitudes of the peaks, $R_{ij}(\tau_{ij}[m, n])$. Eq. (16) may be transformed into a linear set of equations by taking the logarithm of both sides. This leaves, $$\rho_{ij}[m, n] = \beta_i[m] + \beta_j[n], \quad (17)$$

where, $$\rho_{ij}[m, n] \equiv \ln R_{ij}[m, n], \quad (18)$$

$$\beta_i[m] \equiv \ln b_i[m]. \quad (19)$$

These equations may be underdetermined, determined, or overdetermined, and standard least-squares procedures may be used to find solutions.

One can use amplitude information to identify peaks in correlation functions by selecting a set of multipath travel-times and amplitudes that yield a best fit to the measurements. That is, one forms the residual vector, $$\vec{r}_{D\times 1} \equiv \frac{1}{D} \begin{pmatrix} (R_{ij}[m, n] - \tilde{b}_i[m]\tilde{b}_j[n])/R_{ij}[m, n] \\ (R_{ik}[m, p] - \tilde{b}_i[m]\tilde{b}_k[p])/R_{ik}[m, p] \\ \vdots \end{pmatrix}, \quad (20)$$

where there are D nondegenerate peaks in the correlation functions. The least-squares solutions to Eq. (17) are denoted $\tilde{b}_i[m]$. One finds the peaks in correlation functions such that the length of $\vec{r}$ is minimum. A practical means for doing this is given in Sec. V. Note that this residual vector places equal weight on the model's fit to large and small peaks since the misfit for each peak is normalized by the amplitude of the peak.

V. IMPLEMENTING THE CORRELATION EQUATIONS

A. The Difficulty of a Global Search

For two receivers, a global search of the lags that satisfy the lag-equations may be impractical to implement (Table III in Spiesberger, 1996). The simulations in Sec. VI use ten multipaths at each of five receivers because these choices are similar to experimental conditions (Spiesberger, 1997). With R=5 and $N_j$=10 for all j, Eq. (12) yields 990 lag-equations. A global search for the best solution of relative travel times would require about $3\times10^{33}$ trials of the lag-equations (Appendix B).

Suboptimal but efficient techniques are used to find solutions to the lag-equations in lieu of a global search. The process of finding a solution is one in which one winnows down the number of trials that must be examined by any means that can be thought of. I will also explain how to estimate the peaks that are nondegenerate so that their amplitudes may be used to identify reference-lag sets.

B. Estimating Reference-lags and Relative Travel Times with Lag-equations

There are six principal steps used to estimate the reference-lags and the relative travel-times of the multipaths from the lag-equations.

1. Estimating $N_j$

Peaks are selected from each correlation function. For R receivers, there are R different auto-correlations and (R(R−1))/2 different cross-correlations. For example, for R=3, the three auto-correlations are $R_{11}$, $R_{22}$, and $R_{33}$. The three cross-correlations are $R_{12}$, $R_{13}$, and $R_{23}$. After the peaks are selected, the numbers of multipaths at each receiver are estimated (Sec. II).

2. Reference-lag Sets

The equations in (9) are used to find relationships between the reference-lags in the cross-correlation functions. Different equations are subtracted from one another as in, $$\tau_{ij}[q, 1] = \tau_{ij}[q, 1] - \tau_{ij}[1, 1] - (\tau_{ik}[q, 1] = \tau_{ik}[q, 1] - \tau_{ik}[1, 1])$$

which yields, $$0 = -t_j[1] + t_k[1] - \tau_{ij}[1, 1] + \tau_{ik}[1, 1]$$

and finally, $$\tau_{ij}[1, 1] = \tau_{ik}[1, 1] + \tau_{kj}[1, 1], \; i=1 \text{ and } j<k. \quad (21)$$

Letting i>1 yields redundant equations. As we will see later, there may be more than one set of peaks satisfying this equation. Each set of lags satisfying Eq. (21) is called a "reference-lag set." For example, if there are five receivers, each reference-lag set contains values for, $$\begin{pmatrix} \tau_{12}[1,1] & \tau_{13}[1,1] & \tau_{14}[1,1] & \tau_{15}[1,1] \\ & \tau_{23}[1,1] & \tau_{24}[1,1] & \tau_{25}[1,1] \\ & & \tau_{34}[1,1] & \tau_{35}[1,1] \\ & & & \tau_{45}[1,1] \end{pmatrix}. \quad (22)$$

The upper and lower bounds for each reference-lag are given by, $$|\tau_{ij}[1,1]| \le \frac{d_{ij}}{c_{slowest}}, \quad (23)$$

where the distance between the receivers is $d_{ij}$ and the slowest speed that sound can propagate between the receivers is $c_{slowest}$. This means that the absolute value of the difference in travel-time between the first arrivals at each receiver is bounded by the distance between the receivers divided by the slowest speed that sound can travel.

A global search for reference-lag sets may be impractical to implement. For example, if there are 100 peaks in each cross-correlation function between the lags specified in Eq. (23), and if there are five receivers, then there are $100^5=10^{10}$ candidate reference-lag sets to try in Eq. (21).

3. Converging to a Solution Using Augmented-template Correlation Functions (ATCFs)

Instead of using a global search for reference-lag sets, a function is introduced that facilitates a practical solution to the problem. Some of the peaks in the auto-correlation function for channel i have the same relative intervals as the travel-times for that channel (FIG. 2). This follows because the lags given by $\tau_{ii}[m, 1] = t_i[m] - t_i[1]$ occur at peaks in each auto-correlation function if the peaks are of sufficient signal-to-noise ratio. The cross-correlation between receivers i and j has $N_j$ replications of these same relative travel-times (FIG. 2). It may thus be advantageous to compare the patterns of peaks in auto and cross-correlations. Of course, the autocorrelation function may also have peaks at lags that are not the same as the relative travel-times of the multipaths (FIG. 2). Nonetheless, let us see how far we can go by comparing the "augmented templates" of relative travel-times in auto-correlations functions with the patterns of peaks in cross-correlation functions.

An efficient means to look for pattern similarities between peaks in auto and cross-correlation functions is to introduce an "augmented-template correlation function" (ATCF) which is similar to cross-correlating non-negative lags of an auto-correlation with a cross-correlation. The efficiency of the function comes from the pattern similarities between auto and cross-correlations and the use of Fast-Fourier transforms in implementing cross-correlations. The "F-augmented-template correlation function" (F-ATCF) is defined as, $$F_{ij}(T) \equiv \int_0^{\tau_{max}} \check{R}_{ii}(\tau) \check{R}_{ij}(\tau-T) d\tau, \qquad (24)$$

where, $$\check{R}_{ij}(\tau) \equiv \begin{cases} 0; & \text{if there is no peak at lag } \tau \text{ in } R_{ij}(\tau) \\ 1; & \text{if there is a peak at lag } \tau \text{ in } R_{ij}(\tau), \end{cases}$$

is used so that $F_{ij}(T)$ yields the number of occurrences of matching peaks between the auto and cross-correlation functions as a function of the lag T. Note that only non-negative lags of the auto-correlation function are used to form $\check{R}_{ii}(\tau)$ because the template for patterns in the cross-correlation function occur at non-negative lags in the auto-correlation. The maximum lag considered in an auto-correlation is $\tau_{max}$.

The peaks in the auto-correlation function not corresponding to relative travel-times may add undesirable counts in the F-ATCF, but when this does not occur, the F-ATCF reaches a value of $N_i$, the number of multipaths in channel i. Then, $F_{ij}(T)$ will reach a value of $N_i$ exactly $N_j$ times. These $N_j$ occurrences will occur at intervals equal to the relative travel-times at receiver j. The most negative lag of these $N_j$ occurrences equals $-\tau_{ij}[1, 1]$, the opposite of a desired reference-lag (FIG. 2).

Similarly, the "B-augmented-template correlation function" (B-ATCF) is defined as, $$B_{ij}(T) \equiv \int_0^{\tau_{max}} \check{R}_{jj}(\tau) \check{R}_{ji}(\tau-T) d\tau. \qquad (25)$$

The B stands for backwards, since the cross-correlation lags are reversed prior to correlation with $\check{R}_{jj}(\tau)$. Again, the peaks in the auto-correlation function not corresponding to relative travel-times may add undesirable counts in the B-ATCF, but when this does not occur, the B-ATCF reaches a value of $N_j$, the number of multipaths in channel j. Then, $B_{ij}(T)$ will reach a value of $N_j$ exactly $N_i$ times. These $N_i$ occurrences will occur at intervals equal to the relative travel-times at receiver i. The most negative lag of these $N_i$ occurrences equals $\tau_{ij}[1, 1]$; a desired reference-lag (FIG. 2).

In less idealistic cases, ATCFs may have large values at lags not associated with reference-lags either because not all the peaks in auto and cross-correlations are selected or because the augmented-templates in auto-correlations have peaks at lags that are not equal to the relative travel-times in a channel and those peaks line up with other peaks in the cross-correlation function under the ATCF operation.

Preliminary candidates for the reference-lags, $\tau_{ij}[1, 1]$, are chosen at lags, $-T = T_{F_{ij}}(p)$, $p = 1, 2, 3, \ldots P_{F_{ij}}$ and $T = T_{B_{ij}}(p)$, $p = 1, 2, 3, \ldots P_{B_{ij}}$, of the forward and backwards ATCFs respectively which satisfy, $$F_{ij}(-T) \geq F_0; |-T| \leq \frac{d_{ij}}{c_{slowest}} \qquad (26)$$

$$B_{ij}(T) \geq F_0; |T| \leq \frac{d_{ij}}{c_{slowest}}, \qquad (27)$$

where $F_0$ is a threshold value above which preliminary candidates are chosen. More candidates are selected as $F_0$ decreases. Only preliminary candidates obeying the intersections, $\cap$, of the three sets, $$T_{FB_{ij}} \in \{T_{F_{ij}}(1), T_{F_{ij}}(2), \ldots T_{F_{ij}}(P_{F_{ij}})\} \cap \{T_{B_{ij}}(1), T_{B_{ij}}(2), \ldots T_{B_{ij}}(P_{B_{ij}})\} \cap \{\tau_{ij}(1), \tau_{ij}(2), \ldots \tau_{ij}(P_{data})\} \qquad (28)$$

are taken under further consideration. The lags at which the $P_{data}$ peaks occur in the cross-correlation function i–j are in the third set.

It may still be impractical to sort the candidates into reference-lag sets because of their large numbers. It has been suggested that a search may be terminated along a particular branch when a candidate for $\tau_{pq}[1, 1]$ cannot be found which satisfies Eq. (21) within a specified tolerance (Premus, pers. comm. 1996). This same strategy is also adopted when candidates for $\tau_{ij}[q, 1]$ are selected in Eq. (29) which appears in the next section. Even so, the truncated search may be impractical at this stage. Instead, the numbers of candidates are usually small enough to see if they satisfy any identity in Eq. (21). Candidates that do not satisfy any of these equations are discarded.

The number of reference-lag candidates is further reduced for each receiver r by examining R−1 ATCFs, namely, $F_{ir}(T)$, $i \neq r$. If $i < r$, $F_{ir}(T)$ has the pattern of relative lags, $t_r[n]$ starting at lag $T = -\tau_{ir}[1, 1]$. If $i > r$, $F_{ir}(T)$ has the same pattern of relative lags starting at $T = \tau_{ir}[1, 1]$. The last sentence is true because $F_{ir}(T) = B_{ri}(T)$ when $i > r$. We would like to intersect the lags where peaks exceeding $F_0$ occur among these R−1 ATCFs to better reveal the $t_r[n]$ pattern. Of course, we do not yet know the correct value for the reference-lag, $\tau_{ir}[1, 1]$, so the intersections need to be made over all candidates for this lag. The reference-lag candidates which yield greater than $F_1$ intersections are selected for further consideration. In the ideal case, $F_1 = N_r$, the number of multipaths at receiver r.

The remaining candidates for reference-lags form a small enough set so that they can be sorted into reference-lag sets using an exhaustive technique which is truncated if a particular branch cannot be fitted to the equations. At this point, there may be more than one reference-lag set.

4. Using Eq. (9) with n=1

The fourth and fifth steps require peaks in correlation functions to obey all the equations (9) for n=1. For each reference-lag set, we find the number of different q at receiver i which satisfy all the equations, $$\tau_{ii}[q, 1] = \tau_{ij}[q, 1] - \tau_{ij}[1, 1], i \neq j; \qquad (29)$$

where $q \geq 2$. One hopes that the correct reference-lag set, which comes into play with the $\tau_{ij}[1, 1]$ term, yields a greater number of q's satisfying Eq. (29) than incorrect reference-lag sets. Note that Eq. (29) yields estimates of the relative travel-times at each receiver. One chooses the ith receiver, and goes through each positively-lagged peak in its auto-correlation function. If the lag of that peak is the same as the difference of lags given on the right-hand side of Eq. (29) for all j's not equal to i, then we have found an acceptable value of q, and we have an estimate as to whether it is the second, third, or n'th arrival at receiver i.

5. Using Eq. (9) with n>1

The fifth step checks if accepted values of $\tau_{ii}[q, 1]$ from step four obey the remaining equations in (9) for n greater than one. Eq. (9) is written as, $$\tau_{ij}[q, n] = \tau_{ii}[q, 1] - \tau_{jj}[n, 1], \; i \neq j, \tag{30}$$

for q=2, 3, 4, . . . . Although Eq. (9) limits n=1 for i>j, valid, but redundant, equations are also produced when n>1. In my implementation of the lag-equations, n is allowed to exceed one when i>j.

Step four identifies candidates for the right-hand side of Eq. (30). Consider a particular value for i and q in Eq. (30). There are, $$maxfind(i) = \sum_{j=1, j \neq i}^{R} ncand(j), \tag{31}$$

different equations involving the candidate lag $\tau_{ii}[q, 1]$ where the number of candidates for $\tau_{jj}[n, 1]$ is ncand(j). The number of times that $\tau_{ii}[q, 1]$ obeys Eq. (30) is denoted by "nmatchup". This candidate, $\tau_{ii}[q, 1]$ is accepted if a fraction, $0 \leq f \leq 1$, of the maximum number of matches is found from the data, e.g. when, $$nmatchup >= f \cdot maxfind(i). \tag{32}$$

Otherwise, it is discarded.

6. Objective Functions

Two objective functions are used to identify the correct reference-lag set. These functions depend on the numbers of peaks in the correlation functions which satisfy the lag-equations. They do not depend on the amplitudes of the correlation peaks.

For the first function, step five yields q=2, 3, 4, . . . $S_i$–1 multipaths at the ith receiver which satisfy Eq. (29). $S_i$ is the total number of multipaths at receiver i satisfying the lag-equations, including the first arrival. We expect that the correct reference-lag set will yield better fits to the data which will tend to yield greater values of $S_i$. An objective function for goodness of fit is thus defined as, $$S \equiv \sum_{i=1}^{R} S_i, \tag{33}$$

which is a function of the reference-lag set. This measure does not depend on the amplitudes of peaks in the auto and cross-correlations as long as peaks are detected in the output of a correlator.

The second objective function is based on the F-ATCFs. $F_{ij}(T)$ tends to have large values at times corresponding to the pattern of relative arrival times of multipaths at receiver j (FIG. 2). In fact, $t_j[1]$ occurs at lag $T = -\tau_{ij}[1, 1]$ where $\tau_{ij}[1, 1]$ is an element of a candidate reference-lag set. There are R−1 different F-ATCFs yielding the relative arrival times, $\tau_{ij}[n, 1]$, namely $F_{ij}(T)$, i=1, 2, 3, . . . R; i≠j. If each $F_{ij}(T)$ is shifted to place $t_j[1]$ at the same lag, then the sum of the R−1 shifted F-ATCFs tends to have large values at the relative arrival times, $t_j[n] - t_j[1]$. The advantage in summing the F-ATCFs is that the sum tends to suppress extraneous values in each F-ATCF at lags that do not correspond to the relative arrival times of multipaths at channel j (Sec. A2). These extraneous peaks tend to occur at different lags in each of the R−1 different F-ATCFs that are summed, but the relative arrival times in channel j always occur at the same relative arrival times in each F-ATCF. The sum is defined as, $$\mathcal{F}_j(\mathcal{T}) \equiv \sum_{i=1, i \neq j}^{R} F_{ij}(T + \tau_{ij}[1, 1]); \; -\tau_{ij}[1, 1] \leq T. \tag{34}$$

For each reference-lag set, an objective function may be formed by summing the values of $F_j(T)$ at the lags which correspond to the relative arrival times of multipaths, $\tau_{jj}[q, 1]$, found from step five. An objective function which accounts for all the $F_j(T)$, j=1, 2, 3, . . . R is, $$C \equiv \sum_{j=1}^{R} \sum_{q=1}^{S_j} \mathcal{F}_j(\mathcal{T} = \tau_{jj}[q, 1]). \tag{35}$$

This objective function should be greatest for the correct reference-lag set.

C. Evaluating Reference-lags Sets with Amplitude Information

All correlation functions are constructed for each reference-lag set using the relative travel-times, $\tau_{ii}[q, 1]$; q=2, 3, 4, . . . $S_i$–1, found above. The amplitude of a peak in a correlation function is used only if that peak in nondegenerate. The length of the residual vector given by Eq. (20), $$r \equiv |\vec{r}|, \tag{36}$$

is used as an objective function for each particular set of reference-lags. The smaller the length of the residual, the more likely correct is its associated reference-lag set.

VI. SIMULATION

A simulation is carried out to demonstrate that the correlation equations can be used to estimate the correct reference-lags and the amplitudes and relative arrival times of many multipaths. The example is similar to an experiment conducted by the author (Spiesberger, 1997). In that experiment, there were O(10) multipaths arriving at each of five receivers.

The simulated signal from the source is frequency modulated from 2500 to 3500 Hz over a period of 0.3 s. The frequency changes linearly with time and the envelope of the energy is constant throughout the 0.3 s interval. The waveform is output at a sample frequency of 16,000 Hz. The center frequency and bandwidth are similar to the calls of Red-Winged Blackbirds, *Agelaius phoeniceus* (Spiesberger, 1997).

TABLE I

The Cartesian coordinates of the five receivers used for the simulation in Sec. VI.

| Receiver | x (m) | y (m) | z (m) |
|---|---|---|---|
| R1 | 0 | 0 | 0 |
| R2 | 19.787 | 0 | 0 |
| R3 | 17.739 | −18.770 | 0 |
| R4 | 2.023 | −29.690 | 1.216 |
| R5 | −12.489 | −13.923 | 2.182 |

The source is located at Cartesian coordinate (10,10,2), given in meters. The locations of the five receivers are given in Table I. The speed of sound is assumed to be 340 m s$^{-1}$. The wind-speed is set to zero. The resulting differences in travel-times between the first arrivals are, $$\tau_{12}[1, 1] = +0.0004 \text{ s}$$
$$\tau_{13}[1, 1] = -0.0458 \text{ s}$$
$$\tau_{14}[1, 1] = -0.0771 \text{ s} \qquad (37)$$
$$\tau_{15}[1, 1] = -0.0546 \text{ s}$$

Figure 3:
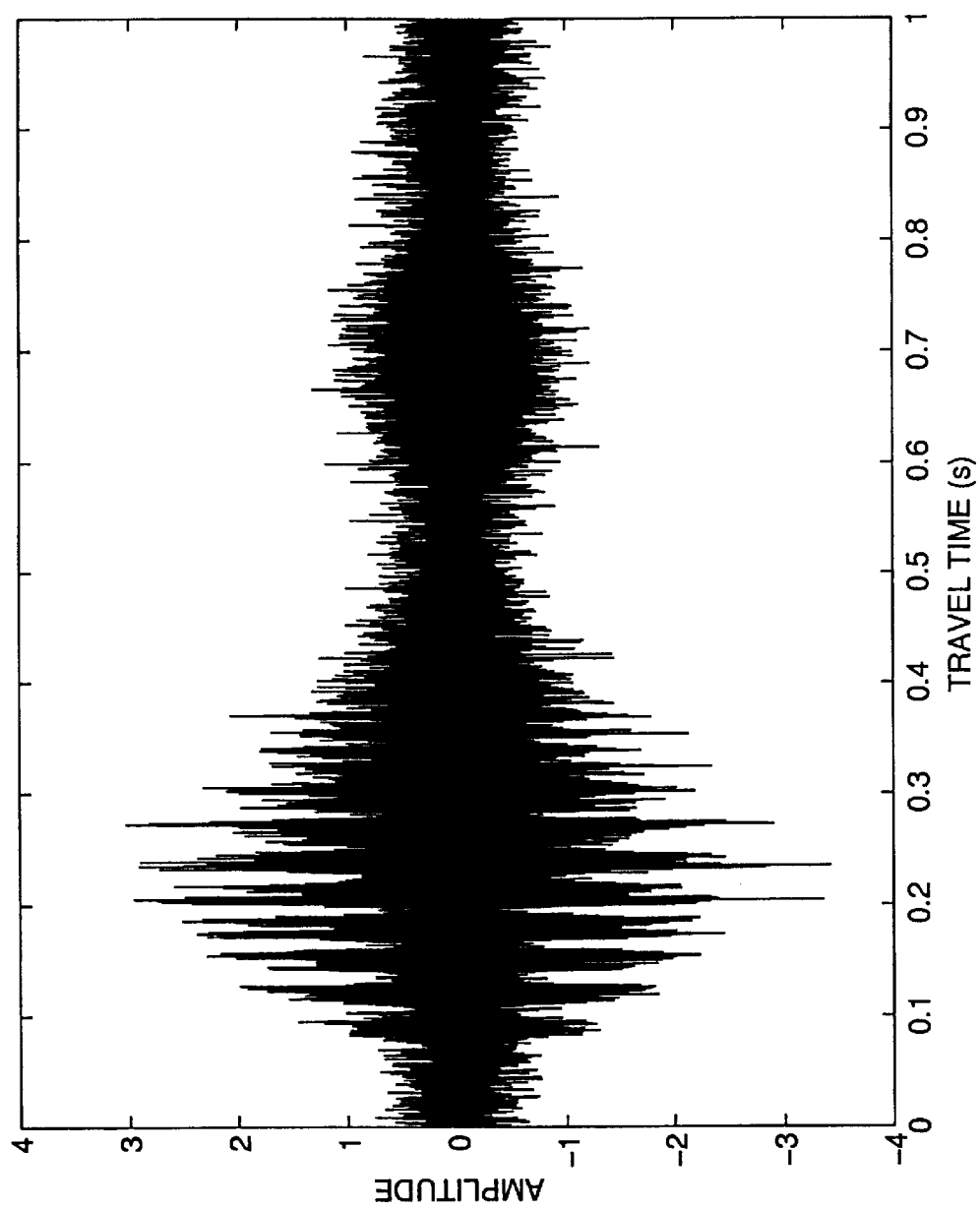
FIG. 3. is the simulated signal at receiver one. It consists of ten multipaths whose travel-times and amplitudes are indicated in Table II. The peak signal-to-noise ratio for the first multipath is 4 dB. See Sec. VI.

Nine other multipaths arrive at each receiver. All ten multipaths are modeled according to Eq. (1) with values given in Table II. White-Gaussian noise is added at each receiver so that the first arrival has a signal-to-noise ratio of 4 dB (FIG. 3).

TABLE II

Travel-times, $t_i$ (s), and amplitudes, $a_i$, of the multipaths at each of five receivers

| Receiver No. | | | | | | | | | |
|---|---|---|---|---|---|---|---|---|---|
| R1 | | R2 | | R3 | | R4 | | R5 | |
| $t_1[n]$ | $a_1[n]$ | $t_2[n]$ | $a_2[n]$ | $t_3[n]$ | $a_3[n]$ | $t_4[n]$ | $a_4[n]$ | $t_5[n]$ | $a_5[n]$ |
| 0.0420 | 0.8 | 0.0416 | 1.0 | 0.0878 | 0.7 | 0.1191 | 1.0 | 0.0966 | 1.0 |
| 0.0470 | 1.0 | 0.0446 | 0.4 | 0.0958 | 0.3 | 0.1291 | 0.9 | 0.2966 | 0.9 |
| 0.0510 | 0.3 | 0.1416 | 0.6 | 0.2078 | 1.0 | 0.1361 | 0.8 | 0.3096 | 0.7 |
| 0.0570 | 0.5 | 0.2416 | 0.3 | 0.2878 | 0.5 | 0.3491 | 0.7 | 0.4416 | 0.7 |
| 0.1020 | 0.2 | 0.2506 | 0.3 | 0.2958 | 0.5 | 0.3691 | 0.6 | 0.5966 | 0.7 |
| 0.1420 | 0.4 | 0.2716 | 0.3 | 0.3878 | 0.4 | 0.4191 | 0.5 | 0.6366 | 0.5 |
| 0.1510 | 0.7 | 0.2726 | 0.3 | 0.5878 | 0.4 | 0.4281 | 0.4 | 0.6766 | 0.5 |
| 0.1620 | 0.3 | 0.5416 | 0.3 | 0.6878 | 0.4 | 0.5191 | 0.3 | 0.6966 | 0.3 |
| 0.2320 | 0.5 | 0.5425 | 0.2 | 0.7878 | 0.4 | 0.6191 | 0.3 | 0.7966 | 0.3 |
| 0.5420 | 0.6 | 0.7416 | 0.1 | 0.7948 | 0.3 | 0.6331 | 0.3 | 0.9966 | 0.1 |

Figure 4:
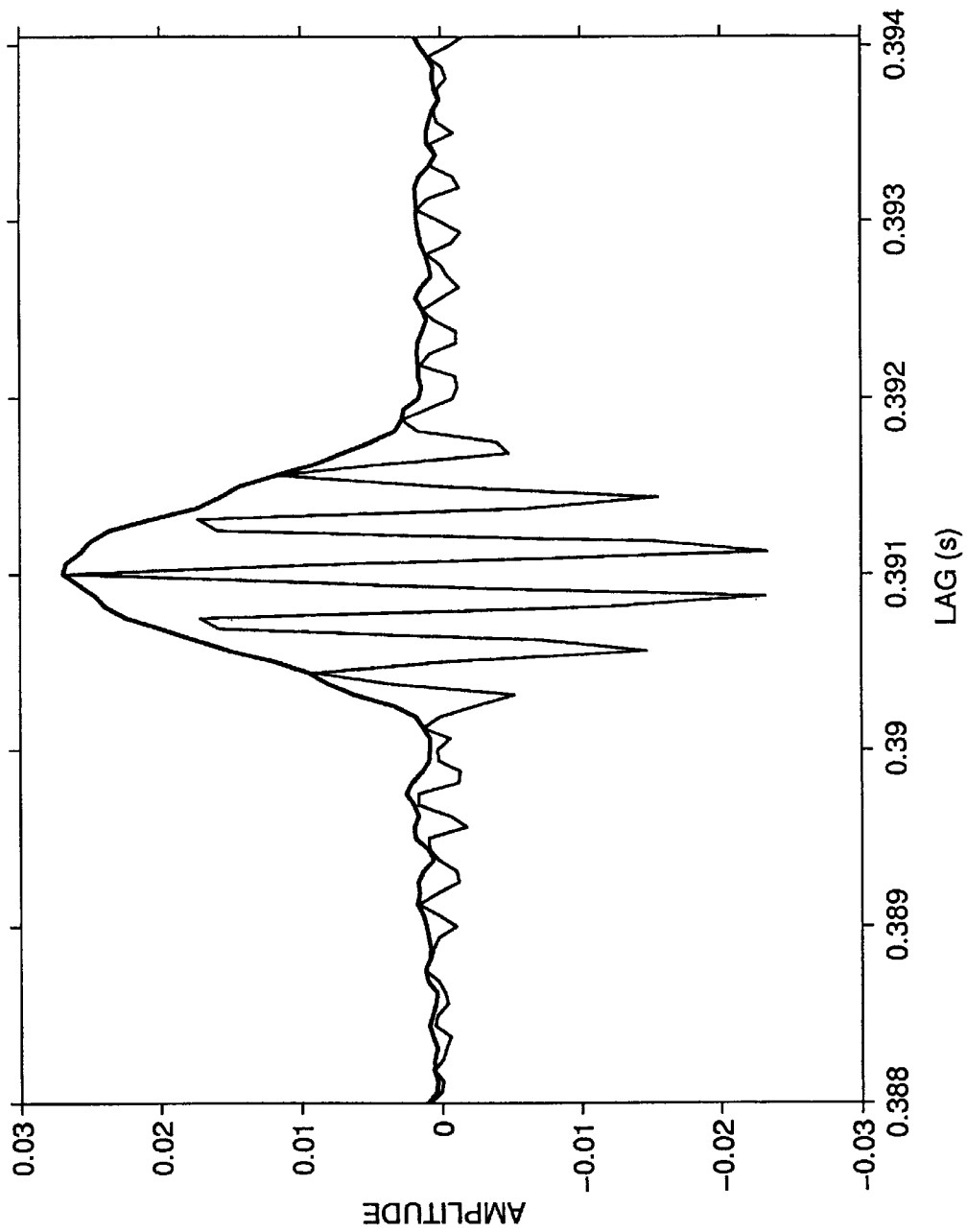
FIG. 4 is the auto-correlation function from receiver one near a peak (thin line). The thick line is the amplitude of the Hilbert transform.
Figure 5A:
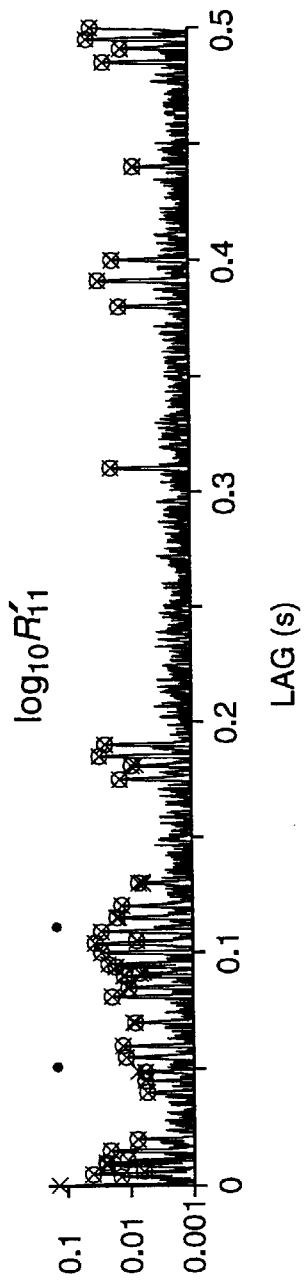
FIG. 5 are the logarithms of the envelopes of the auto-correlation functions (ACF) at the five receivers up to a lag of 0.5 s. $R'_{11}$ is the amplitude of the Hilbert transform of the ACF of the signal shown in FIG. 3. The peaks selected for implementing the equations given in (9) are marked with an 'x'. Without noise, the auto-correlation functions would have peaks at lags where the circles and dots are placed. If the peaks in the noise-less ACF are within 0.00025 s of a selected peak, the selected peak is also circled. Otherwise, a dot is placed at the lag where the noise-less auto-correlation function has a peak. The peaks of the noise-less auto-correlation function are computed from the parameters in Table II.
Figure 5B:
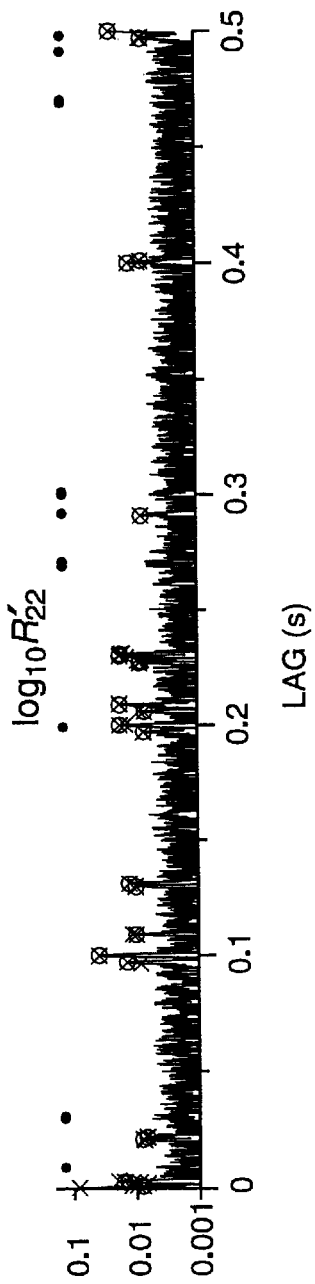
Figure 5C:
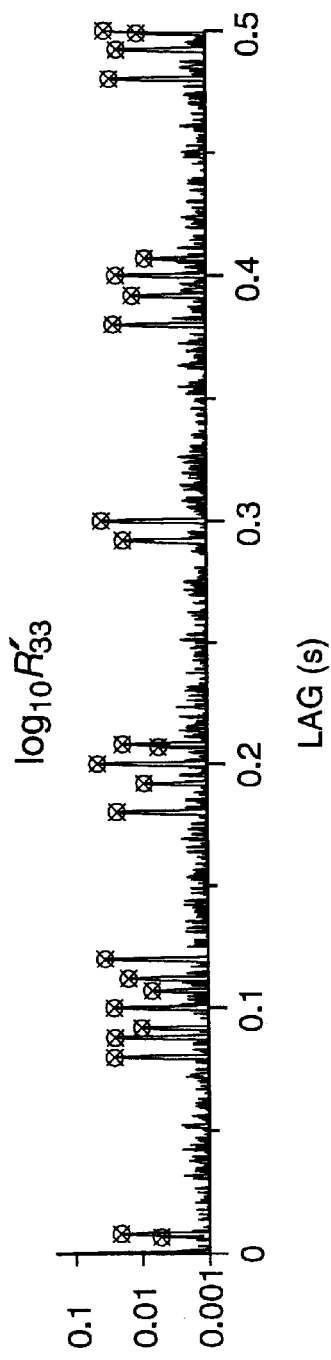
Figure 5D:
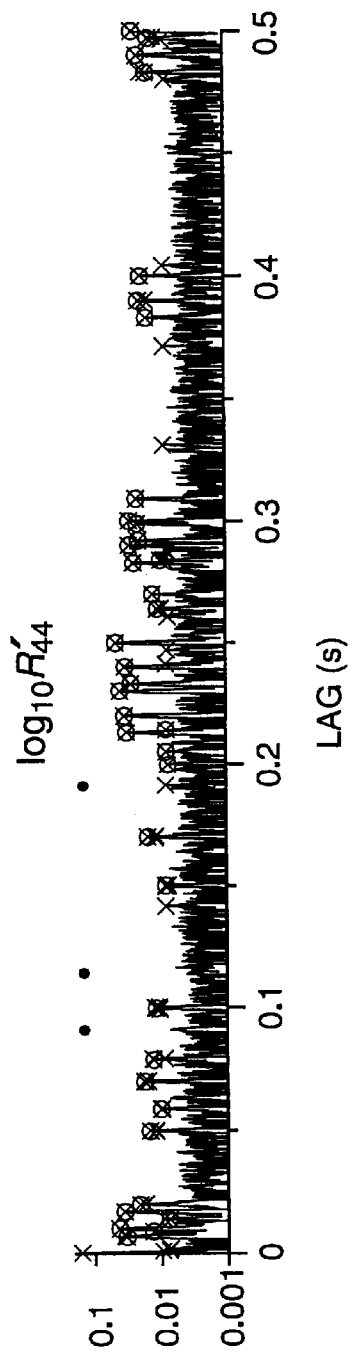
Figure 5E:
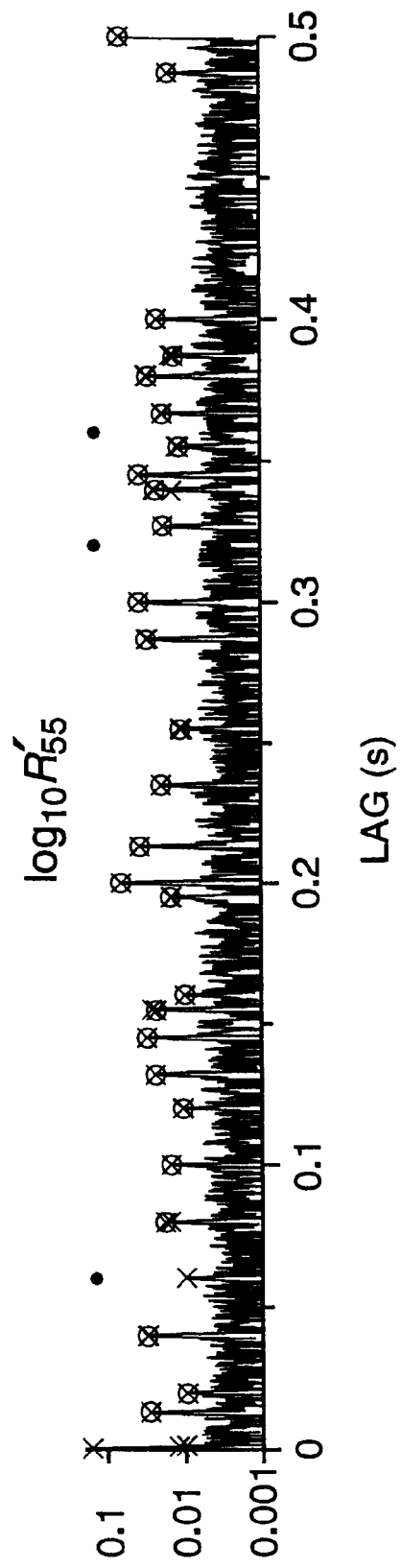
Figure 6A:
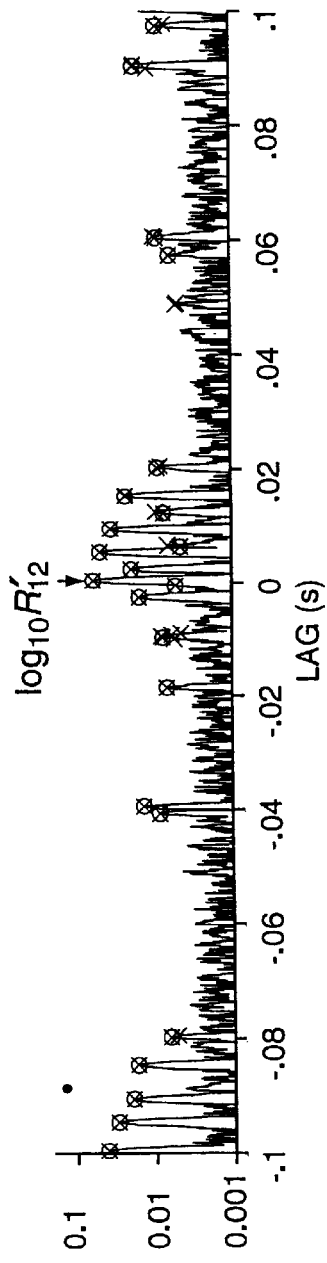
FIG. 6 are the logarithms of the envelopes of the indicated cross-correlation functions (CCF) between the lags of −0.1 and +0.1 s for the simulation discussed in Sec. VI. The x's, circles, and dots indicate the same things as in FIG. 5. The arrows identify the reference-lags, $\tau_{12}[1, 1], \tau_{13}[1, 1], \tau_{14}[1, 1]$, and $\tau_{15}[1, 1]$, which best satisfy the lag and amplitude-equations discussed in Secs. III and IV. Those reference-lags are +0.0004, −0.0459, −0.0771, and −0.0546 s respectively. These are consistent with the travel-time differences computed from the first-arrivals in Table II within 0.00025 s.
Figure 6B:
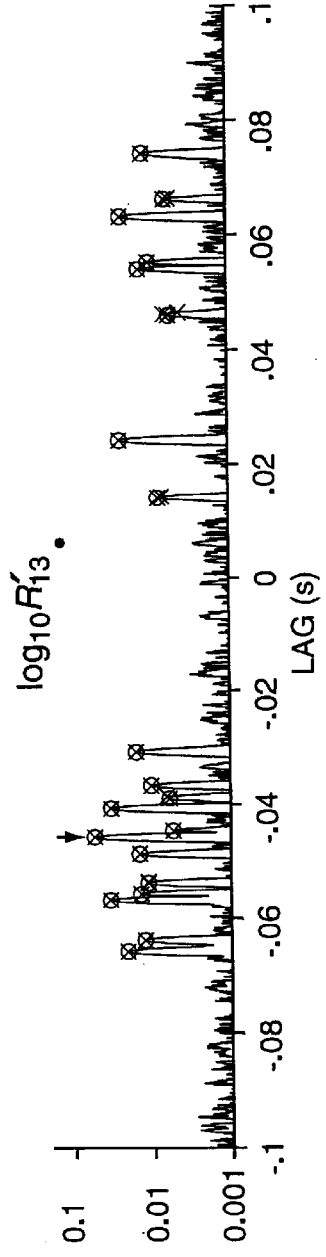
Figure 6C:
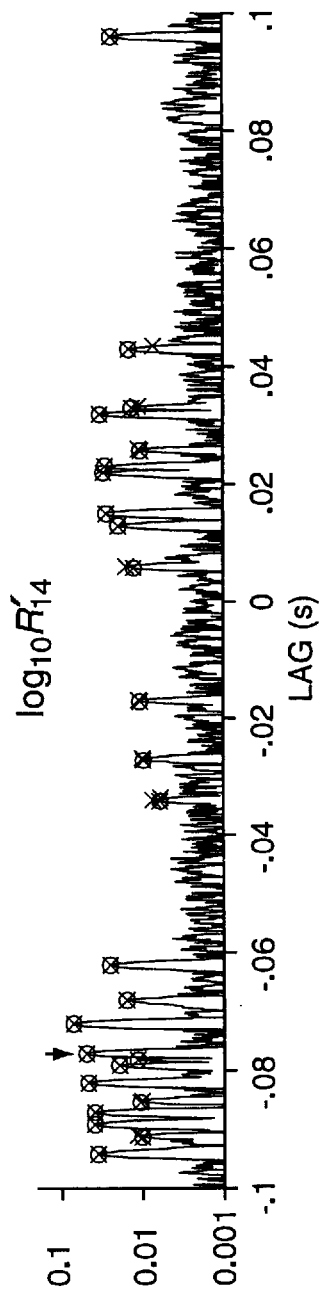
Figure 6D:
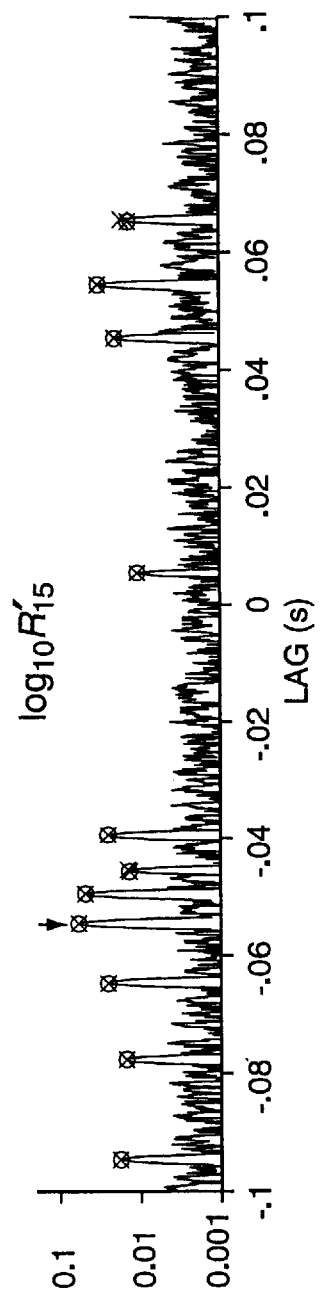

The correlation functions have a ringing component near 3000 Hz; the center frequency of the synthesized signal (FIG. 4). If there is one multipath, then the correlation functions have a main peak with nearby peaks of lesser magnitude at $$\frac{1}{3000}s$$

intervals. The envelope of this energy is confined within a millisecond, which is the inverse bandwidth of the signal. To suppress the selection of these peaks of lesser-magnitude, peaks are selected from an envelope which is the amplitude of the Hilbert transform (Claerbout, *Fundamentals of Geophysical Data Processing,* McGraw-Hill, New York, pp. 59–62, 1976) of the auto or cross-correlation function (FIG. 4). The envelope of a correlation function is denoted by $R'_{ij}$.

Trials 1 and 2 below are designed to investigate whether the estimated reference-lags are sensitive to the numbers of peaks selected from each correlation. In these trials, the lag-equations are satisfied if the right and left-hand sides of Eq. (9) are within 0.000125 s of each other. Also, f=0.7 in Eq. (32). Similar results are obtained for different values of f.

A. Trial 1

The auto-correlation functions of receivers one through five have O(100) peaks at positive lag. Peaks at lags less than 0.5 s are shown in FIG. 5. I tried to pick many peaks and succeeded in getting most of them which correspond to the signal. Signals which lead to small peaks are sometimes missed. For example, the most positively-lagged peak in the auto-correlation function of receiver five was not selected because it has a very low signal-to-noise ratio. This is particularly relevant because the previous algorithm for estimating reference-lags depends on having chosen this peak (Spiesberger, 1996). Table III lists the numbers of peaks selected from each correlation.

TABLE III

The number of peaks selected from the indicated correlation pairs.

| Correlation Pair | No. Peaks Selected | |
|---|---|---|
| | Trial 1 | Trial 2 |
| $R'_{11}$ | 52 | 45 |
| $R'_{12}$ | 358 | 63 |
| $R'_{22}$ | 56 | 20 |
| $R'_{13}$ | 123 | 107 |
| $R'_{23}$ | 212 | 95 |
| $R'_{33}$ | 38 | 36 |
| $R'_{14}$ | 147 | 89 |
| $R'_{24}$ | 190 | 89 |
| $R'_{34}$ | 133 | 102 |
| $R'_{44}$ | 83 | 52 |
| $R'_{15}$ | 116 | 69 |
| $R'_{25}$ | 137 | 72 |
| $R'_{35}$ | 101 | 89 |
| $R'_{45}$ | 160 | 137 |
| $R'_{55}$ | 53 | 43 |

The numbers of multipaths at each receiver, $N_i$, are estimated using the criterion given in Eq. (5). The results yield $\tilde{N}_i$ equal to 17, 22, 10, 14, and 12 for i equal to one through five respectively. The estimated values are generally larger than the correct value of ten because most of the peaks corresponding to signal are selected and many additional peaks due to noise are selected (Table III).

The implementation of the lag-equations yields two reference-lag sets. The objective function, S, for each set is 48 and 37 respectively. The objective function, C, for each set is 1861 and 1432 respectively. Both S and C are greatest for the first set, and this set is the correct one, yielding the values listed in Eq. (37). The other reference-lag sets are incorrect. The arrows in FIG. 6 point to the peaks having these lags in $R'_{1i}$ for i=2, 3, 4, 5. Note that the peak having the correct reference-lag in $R'_{14}$ is not the largest peak. The numbers of multipaths, $S_i$, satisfying the lag-equations at receivers one through five are 9, 7, 12, 9, and 11 respectively. They sum to 48, which equals S in Eq. (33).

Because there is a unique solution for the best reference-lag set based on the objective functions S and C, it is unnecessary to utilize amplitudes to estimate the correct reference-lag set. However, it is instructive to see if the amplitude-equations point to the correct answer. The lengths of the residual vectors, r, in Eq. (36) for the reference-lag sets are 0.0092 and 0.014 respectively. The smallest residual, 0.0092, corresponds to the reference-lag set having the greatest value of S, 48, as hoped for. In other words, modeled amplitudes fit the amplitudes of the nondegenerate peaks within one percent. The objective functions for the amplitude and lag-equations both yield the same reference-lag set.

Errors for the modeled travel-times are estimated from Eq. (C4 in Appendix C). The typical magnitude of the error is 0.0001 s.

Of the 48 multipaths satisfying the lag-equations, 41 have travel-times which correspond to one of the 50 shown in Table II. The remaining 7 do not correspond to a correct travel-time. 40 of the 48 multipaths are predicted to lead to peaks in correlation functions that are nondegenerate. The mean fractional error of the modeled amplitudes of multipaths is 0.2 with a standard deviation of 0.1.

B. Trial 2

This trial is identical to trial 1 except fewer peaks are chosen (Table III). From these selections, the estimated numbers of multipaths, $\tilde{N}_i$, at receivers one through five are 10, 9, 11, 12, and 12 respectively. These are closer to the correct answer of ten than in the first trial because there are fewer selections of noisy peaks.

The implementation of the lag-equations yields two reference-lag sets. The objective function, S, for each set equals 46 and 36 respectively. The objective function, C, for each set is 1493 and 1144 respectively. Both S and C are greatest for the first set, and this set is the correct one, yielding the values listed in Eq. (37). The other reference-lag set is incorrect.

Because there is a unique solution for the best reference-lag set based on the objective functions S and C, it is unnecessary to utilize amplitudes to estimate the correct reference-lag set. However, it is instructive to see if the amplitude-equations point to the correct answer. The lengths of the residual vectors, r, for the two reference-lag sets are 0.0091 and 0.014 respectively. The smallest residual, 0.0091, corresponds to the reference-lag set having the greatest value of S, 46, as hoped for. Thus, the objective functions for the amplitude and lag-equations both yield the same reference-lag set.

Errors for the modeled travel-times have typical magnitudes of 0.0001 s.

Of the 46 multipaths satisfying the lag-equations, 40 have travel-times which correspond to one of the 50 shown in Table II. The remaining 6 do not correspond to a correct travel-time. 39 of the 46 multipaths are predicted to lead to peaks in correlation functions that are nondegenerate. The mean fractional error of the modeled amplitudes of multipaths is 0.2 with a standard deviation of 0.1.

C. Simulation Summary

The two trials yield the same estimates for the reference-lags, and those estimates are correct. The parameters for the multipaths were chosen at random, with no attempt to tune the case so that a satisfactory outcome would be achieved. Note that although the largest peaks in the cross-correlation functions usually, but not always, correspond to reference-lags, there is no prior information that larger peaks are more likely to correspond to reference-lags.

The lags in the correlation functions which survive the lag equations are likely to correspond to correct values for the relative travel-times of the multipaths. For example, about 80% of the correct values for the relative travel-times were found from the lag-equations. The amplitudes of the modeled multipaths had mean errors of about 20%.

The results for the simulation are insensitive to the tolerance with which the lag-equations are implemented. For example, when the tolerance is increased from 0.000125 to 0.0003125 s, all three objective functions yield the correct reference-lag set for trials one and two.

VII. DISCUSSION

Correlation equations have been derived which relate the lags and amplitudes of peaks in the auto and cross-correlation functions to one another. The global solution for the relative travel-times and amplitudes of multipaths may be difficult to estimate because of the large number of cases to check. The sub-optimal implementation of the equations yields correct answers for the differences in travel-time between the first signals that arrive at each receiver pair. The implementation also yields information for the relative travel-times and amplitudes of other multipaths. The results are not sensitive to the numbers of peaks picked from the correlation channels. Other implementations of the equations may yield solutions whose objective functions have greater variations between the correct and incorrect reference-lag sets. For example, a global search can yield a variation of two orders of magnitude (FIG. 5 in Spiesberger, 1996).

The utility of the techniques presented here can only be appreciated after testing them with many different kinds of data. I successfully localized calling birds in my yard in Pennsylvania using these techniques (Spiesberger, 1997). The techniques may have application for localizing acoustic sources such as whales when the geometry of only some of the multipaths may be estimated (Premus et al., J. Acoust. Soc. Am., 101, 1127–1138, 1997).

APPENDIX A. NUMBER OF LAG-EQUATIONS

In Eq. (9), when i<j, hold i, j, and q fixed. There are $N_j$ equations. Letting j vary yields $\Sigma_{j=2}^{R} N_j$ equations. Letting q vary yields $(N_i-1)\Sigma_{j=2}^{R} N_j$ equations. Letting i vary yields, $$I_1 \equiv \sum_{j=2}^{R} N_j \sum_{i=1}^{j-1} (N_i - 1); \; i < j, \tag{A1}$$

equations. When i>j in Eq. (9), hold i, j, and q fixed. There is one equation. Letting j vary yields $\Sigma_{j=1}^{i-1} 1$ equations. Letting q vary yields $(N_i-1) \Sigma_{j=1}^{i-1} 1$ equations. Letting i vary yields, $$I_2 \equiv \sum_{i=2}^{R}(N_i-1)\sum_{j=1}^{i-1}1; i>j, \quad (A2)$$

equations. The total number of equations is $I_1+I_2$ which reduces to Eq. (11).

APPENDIX B. GLOBAL SOLUTION FOR LAG-EQUATIONS

Generalizing the method in Spiesberger (1996), a decision is made for the numbers of significant peaks in each auto-correlation at positive lag, $P'_i$, and in each cross-correlation at all lags, $M'_{ij}$. An estimate is made for the numbers of multipaths at each channel, $\tilde{N}_i$ (Sec. II). For each auto-correlation, the number of ways to choose $\tilde{N}_i-1$ candidate lags for $\tau_{ii}[n, 1]$; n=2, 3, 4, ... $\tilde{N}_i$ at positive lag from $P'_i$ lags without replacement is, $$\binom{P'_i}{\tilde{N}_i-1} \equiv \frac{(P'_i)!}{(P'_i-(\tilde{N}_i-1))!(\tilde{N}_i-1)!}. \quad (B1)$$

The reader is referred to Sec. IIB. of Spiesberger (1996) for a similar formula. For cross-correlation between channels i and j, there are $M'_{ij}$ candidates for the reference-lag, $\tau_{ij}[1, 1]$. For each candidate, the candidates for $\tau_{ij}[m, n]$ are determined from the $\tilde{N}_i-1$ and $\tilde{N}_j-1$ candidates for $\tau_{ii}[n, 1]$ and $\tau_{jj}[m, 1]$ respectively. Then, the residual for each identity in Eq. (9) can be calculated. So for each i–j pairing there are, $$\binom{P'_i}{\tilde{N}_i-1}\binom{P'_j}{\tilde{N}_j-1}M'_{ij},$$

realizations. For R receivers, there are, $$\sum_{j=2}^{R}\sum_{i=1}^{j-1}\binom{P'_i}{\tilde{N}_i-1}\binom{P'_j}{\tilde{N}_j-1}M'_{ij},$$

realizations of the lag equations. Because the estimated number of multipaths are uncertain, an additional sum over realizations of the multipaths is necessary, say from $\check{N}_i \leq \tilde{N}_i \leq \hat{N}_i$. The global search thus requires, $$Z=\sum_{\tilde{N}_1=\check{N}_1}^{\hat{N}_1}\sum_{\tilde{N}_2=\check{N}_2}^{\hat{N}_2}\sum_{\tilde{N}_3=\check{N}_3}^{\hat{N}_3}\cdots\sum_{\tilde{N}_R=\check{N}_R}^{\hat{N}_R}\sum_{j=2}^{R}\sum_{i=1}^{j-1}\binom{P'_i}{\tilde{N}_i-1}\binom{P'_j}{\tilde{N}_j-1}M'_{ij}, \quad (B2)$$

realizations of the lag-equations. For R=5, $P'_i=M'_{ij}=100$, $\forall$ i and j, and $8 \leq \hat{N}_i \leq 12$, $\forall$ i, $Z=3\times10^{33}$.

APPENDIX C. ESTIMATING ERRORS IN MEASURED LAGS

Let the measured lag of a correlation peak be, $$\tau_{ij}[m, n]=\tau_{ij}[m, n]+\epsilon_{ij}[m, n], \quad (C1)$$

where $\tau_{ij}[m, n]$ is the lag without error $\epsilon_{ij}[m, n]$. Substituting this in Eqs. (21) and (29) yields, $$\epsilon_{ij}[1, 1]-\epsilon_{ik}[1, 1]+\epsilon_{jk}[1, 1]=\tilde{\tau}_{ij}[1, 1]-\tilde{\tau}_{ik}[1, 1]+\tilde{\tau}_{jk}[1, 1]; i=1, j<k, \quad (C2)$$

and, $$\epsilon_{ii}[q, 1]-\epsilon_{ij}[1, 1]+\epsilon_{ij}[1, 1]=\tilde{\tau}_{ij}[q, 1]-\tilde{\tau}_{ij}[q, 1]+\tilde{\tau}_{ij}[1, 1]; i \neq j, q \geq 2, \quad (C3)$$

respectively. Eqs. (C2) and (C3) can be combined into a linear system of equations as, $$W_{L\times U}\vec{\epsilon}_{U\times 1}=\vec{d}_{L\times 1}, \quad (C4)$$

which may be solved using least-squares. The vector, $\vec{\epsilon}$, contains all the epsilons in Eqs. (C2) and (C3). The vector, $\vec{d}$, contains the right-hand sides of Eqs. (C2) and (C3), which are measured quantities.

VII. ESTIMATING TRAVEL TIME DIFFERENCES OF FIRST ARRIVALS

High Signal-to-Noise Ratio

Suppose an animal emits a single call at time zero. Assume the call is described by s(t) where t is time. By definition, the call is initiated by the animal at t=0. Sound reaches receiver j along $N_j$ paths in space, called multipaths. In this paper, $N_j$ paths are assumed to arrive at intervals exceeding the inverse bandwidth of the signal, $(\Delta f)^{-1}$. This width is that found in the output of the auto-correlation function (Helstrom, 1968).

The first arrival is often one that does not reflect from boundaries. It may be the path which most closely approximates the straight line between the animal and the receiver, and thus be useful for localization. The remaining $N_j-1$ paths reach the receiver afterwards either by undergoing refraction in the medium or by interacting with boundaries such as the ground, sea-bottom, trees, or walls (FIG. 1). Assume the pressure field at receiver j is described by, $$r_j(t)=\sum_{n=1}^{N_j}a_j[n]s(t-t_j[n])+e_j(t), \quad (38)$$

where the amplitude and travel time of the nth multipath are $a_j[n]$ and $t_j[n]$ respectively. The noise is $e_j(t)$.

The autocorrelation function (ACF) of the signal at channel j is, $$R_{jj}(\tau) \equiv \int r_j(t)r_j(t-\tau)dt. \quad (39)$$

Substituting Eq. (39) into (1) yields, $$R_{jj}(\tau)=\sum_{n=1}^{N_j}\sum_{m=1}^{N_j}a_j[n]a_j[m]\int s(t-t_j[n])s(t-t_j[m]-\tau)dt + \int e_j(t)e_j(t-\tau)dt, \quad (40)$$

where the sample ACF between the noise and the signal, that is $\int e_j(t)s(t)dt$, is assumed to be negligible. The peaks in the ACF occur at lags, $$\tau_{jj}[n, m] \equiv t_j[n] - t_j[m]. \qquad (41)$$

The cross-correlation (CCF) between channels j and k is, $$C_{jk}(\tau) \equiv \int r_j(t) r_k(t-\tau) dt. \qquad (42)$$

Substituting the expressions for $r_j(t)$ and $r_k(t)$ from (2) yields, $$C_{jk}(\tau) \cong \sum_{n=1}^{N_j} \sum_{m=1}^{N_k} a_j[n] a_k[m] \int s(t-t_j[n]) s(t-t_k[m]-\tau) dt + \int e_j(k) e_k(t-\tau) dt, \qquad (43)$$

assuming that the CCF of s(t) with e(t) is small compared with the terms on the right-hand-side. Peaks occur at lags, $$\tau_{jk}[n, m] \equiv t_j[n] - t_k[m]. \qquad (44)$$

In order to see how to proceed to find the desired arrival time difference, Tau j[1]–Tau k[1], consider the case with three multipaths at each channel j and k. The peaks occur in the ACF of channels j and k for, $$\tau_{jj}[2, 1] = t_j[2] - t_j[1] \qquad (45)$$

$$\tau_{jj}[3, 1] = t_j[3] - t_j[1] \qquad (46)$$

$$\tau_{jj}[3, 2] = t_j[3] - t_j[2], \qquad (47)$$

and, $$\tau_{kk}[2, 1] = t_k[2] - t_k[1] \qquad (48)$$

$$\tau_{kk}[3, 1] = t_k[3] - t_k[1] \qquad (49)$$

$$\tau_{kk}[3, 2] = t_k[3] - t_k[2], \qquad (50)$$

respectively. The peaks in the CCF occur at lags, $$\tau_{jk}[1, 1] = t_j[1] - t_k[1] \qquad (51)$$

$$\tau_{jk}[1, 2] = t_j[1] - t_k[2] \qquad (52)$$

$$\tau_{jk}[1, 3] = t_j[1] - t_k[3] \qquad (53)$$

$$\tau_{jk}[2, 1] = t_j[2] - t_k[1] \qquad (54)$$

$$\tau_{jk}[2, 2] = t_j[2] - t_k[2] \qquad (55)$$

$$\tau_{jk}[2, 3] = t_j[2] - t_k[3] \qquad (56)$$

$$\tau_{jk}[3, 1] = t_j[3] - t_k[1] \qquad (57)$$

$$\tau_{jk}[3, 2] = t_j[3] - t_k[2] \qquad (58)$$

$$\tau_{jk}[3, 3] = t_j[3] - t_k[3]. \qquad (59)$$

We can measure any lags that appear in the ACF and CCF, but for which lags do we know the associated pair of arrival times by inspection? There are four such lags. They are, 1. $\tau_{jj}[N_j, 1]$: the peak with most positive lag in the ACF of channel j. It is due to the arrival time difference between the first and last multipath.
2. $\tau_{kk}[N_k, 1]$: the peak with most positive lag in the ACF of channel k. It is due to the arrival time difference between the first and last multipath.
3. $\tau_{jk}[1, N_k]$: the peak with most negative lag in the CCF occurs at the arrival time of the first multipath in channel j minus the arrival time of the last multipath in channel k.
4. $\tau_{jk}[N_j, 1]$: the peak with most positive lag in the CCF occurs at the arrival time of the last multipath in channel j minus the arrival time of the first multipath in channel k.

The desired arrival time difference is given by a linear combination of subsets of these four lags. For the example given in Eqs. (45)–(59), $$\tau_{jk}[1, 3] + \tau_{kk}[3, 1] = (t_j[1] - t_k[3]) + (t_k[3] - t_k[1]) = t_j[1] - t_k[1] \qquad (60)$$

$$\tau_{jk}[3, 1] - \tau_{jj}[3, 1] = (t_j[3] - t_k[1]) - (t_j[3] - t_j[1]) = t_j[1] - t_k[1]. \qquad (61)$$

These solutions are identical when there is no noise and no degradation of coherence.

The general rule to find the arrival time difference between first arrivals at two channels is to form, $$\tau_{jk}[1, N_k] + \tau_{kk}[N_k, 1] = t_j[1] - t_k[1] \qquad (62)$$

$$\tau_{jk}[N_j, 1] - \tau_{jj}[N_j, 1] = t_j[1] - t_k[1]. \qquad (63)$$

These estimates are constructed from independent data. The redundancy is useful for checking consistency. If consistent, the best estimate of Tau j[1]–Tau k[1] is formed from their average.

VIII. IDENTIFYING ALL THE RELATIVE ARRIVAL TIMES IN AUTO AND CROSSCORRELATION FUNCTIONS

Some or all of the paths of other than the first arrival may sometimes be useful for localizing signals and mapping the environment with tomography. For example, consider whale sounds collected on a pair of receivers in the ocean. If the whale is calling in shallow water, then the first arrival may travel through the bottom, the second may be a nearly straight path through the water (Premus et al., 1997), and the third may travel through the water with a reflection from the surface. It is then of interest to estimate all the relative arrival times of multipaths at each receiver, $t_j[n] - t_j[1]$, n=2, 3, . . . $N_j$. This section describes a method for obtaining all the relative arrival times from analysis of the auto and crosscorrelation functions. This method also yields estimates for i) the number of resolved multipath, $N_j$, which arrive at each receiver and ii) all the differences in arrival times, $t_j[n] - t_k[m]$, n=1, 2, 3, . . . $N_j$; m=1, 2, 3, . . . $N_k$, between receivers j and k.

A. Estimating $N_j$ and $N_k$

The maximum number of peaks in the ACF at positive lag is given by, $$P_j = \frac{N_j(N_j - 1)}{2}, \qquad (64)$$

(Table IV). This does not include the peak at zero lag. If there are less than $P_j$ peaks, then more than one pair of multipath have similar arrival time differences. For example, if there are $N_j$=3 multipath which arrive at times 0, 1, and 2 s, then there are only two positively-lagged peaks in the ACF at lags of 1 and 2 s. However if the arrival times are 0, 0.5, and 2 s, then there are $$P_j = \frac{3(3-1)}{2} = 3$$

positively-lagged peaks at lags of 0.5, 1.5, and 2 s.

TABLE IV

The maximum number of peaks in the auto-correlation function, $P_j$ versus the number of multipaths arriving at channel j, $N_j$. See Eq. (27).

| Number of multipaths, $N_j$ | Number of positively-lagged peaks, $P_j$ |
|---|---|
| 1 | 0 |
| 2 | 1 |
| 3 | 3 |
| 4 | 6 |
| 5 | 10 |
| 6 | 15 |
| 7 | 21 |
| 8 | 28 |
| 9 | 36 |

Let the number of positively-lagged peaks in the ACF be denoted, $$P'_j \leq P_j. \quad (65)$$

The number of degenerate differences in the channel is, $$U_j = P_j - P'_j. \quad (66)$$

The most likely choice for $N_j$, given $P'_j$ positively-lagged peaks, is given by the condition, $$\frac{(N_j-1)(N_j-2)}{2} < P'_j \leq \frac{N_j(N_j-1)}{2}. \quad (67)$$

The lower limit comes from the fact that $N_j-1$ signals can never yield as many as $P'_j$ positively-lagged peaks in the ACF. On the other hand, arrival time degeneracies lead to $P'_j < P_j$. If there are too many degeneracies, then Eq. (67) yields a value of $N_j$ that is too small. For example, if $P'_j=6$, Eq. (67) yields $N_j=4$, which implies zero degeneracies, i.e. $U_j=0$. However, there could be $N_j=5$ multipaths with $P'_j=6$ positively lagged peaks if there are four degeneracies (Table V).

TABLE V

The second and third columns indicate the number of multipaths and arrival time degeneracies estimated using Eq. (30) given $P'_j$; positively-lagged peaks in the ACF of channel j. The same number of positively-lagged peaks could also be observed if the number of multipaths increased by unity, with correspondingly more arrival time degeneracies, $U_{j+1}$, as shown in column four. The most likely choice for the number of multipaths is $N_j$.

| $P'_j$ | $N'_j$ | # degeneracies ($U_j$) for $N_j$ | # degeneracies ($U_{j+1}$) for $N_j + 1$ |
|---|---|---|---|
| 0 | 1 | 0 | — |
| 1 | 2 | 0 | 2 |
| 2 | 3 | 1 | 4 |
| 3 | 3 | 0 | 3 |
| 4 | 4 | 2 | 6 |
| 5 | 4 | 1 | 5 |
| 6 | 4 | 0 | 4 |
| 7 | 5 | 3 | 8 |
| 8 | 5 | 2 | 7 |
| 9 | 5 | 1 | 6 |
| 10 | 5 | 0 | 5 |
| 11 | 6 | 4 | 10 |
| 12 | 6 | 3 | 9 |
| 13 | 6 | 2 | 8 |
| 14 | 6 | 1 | 7 |
| 15 | 6 | 0 | 6 |
| 16 | 7 | 5 | 12 |
| 17 | 7 | 4 | 11 |
| 18 | 7 | 3 | 10 |
| 19 | 7 | 2 | 9 |
| 20 | 7 | 1 | 8 |
| 21 | 7 | 0 | 7 |

The discussion in the remainder of Section VIII is based on estimates of $N_j$ and $N_k$ from Eq. (67). If the criteria, shown later, for identifying multipaths in the ACF and CCF fail, then a remedy can sometimes be made by increasing the values for $N_j$ or $N_k$ by unity. If the choices for $N_j$ and $N_k$ are correct, then the number of peaks in the CCF, $M'_{jk}$, obeys, $$M'_{jk} \leq M_{jk} \equiv N_j N_k. \quad (68)$$

If $M'_{jk} > N_j N_k$, then either or both of $N_j$ and $N_k$ must be increased.

B. Estimating All the Relative Arrival Times in the ACF and CCF

Suppose the ACF's positively-lagged peaks occur at lags $\Delta_{jj}[n]$, n=1, 2, 3, . . . $P'_j$. Assume these lags are put in monotonically increasing order. For $N_j > 2$, a method is sought for making a one-to-one correspondence between each arrival time difference, $$\mathit{Tauj}[n]-\mathit{Tauj}[1], n=2, 3, \ldots N_j-1$$

and a lag, $\Delta_{jj}[p]$. The most positively-lagged peak in the ACF, $\Delta_{jj}[P'_j]$, is identified as $t_j[N_j]-t_j[1]$, as discussed in Section I. This leaves $P'_j-1$ peaks to identify by a method described later. Similarly, $P'_k-1$ peaks require identification in the ACF of channel k.

For $N_j > 2$, the ACF of channel j has $P'_j-1$ as yet unidentified positively-lagged peaks. An exhaustive searching technique determines these unidentified peaks as follows. We need estimates of the following $N_j-2$ values of relative arrival times, $$t_j[2]-t_j[1]$$

$$t_j[3]-t_j[1]$$

$$t_j[4]-t_j[1] \quad (69)$$

etc.

$$t_j[N_j-1]-t_j[1].$$

There are, $$Q_j \equiv \binom{P'_j - 1}{N_j - 2} \equiv \frac{(P'_j - 1)!}{(P'_j - 1 - (N_j - 2))!(N_j - 2)!}, \quad (70)$$

ways to pick these $N_j-2$ elements, without replacement, from a set of $P'_j-1$ elements, $$\{\Delta_{jj}[1]\ \Delta_{jj}[2]\ \Delta_{jj}[3]\ \ldots\ \Delta_{jj}[P'_j-1]\}.$$

Each selection consists of $N_j-2$ elements denoted by $\Delta_{jj}[1(m)]$, $m=1, 2, \ldots N_j-2$, where $l(m) \in \{1\ 2\ 3\ \ldots\ P'_j-1\}$. Each realization is put in monotonically increasing order as, $\Delta_{jj}[l(i)] < \Delta_{jj}[l(i+1)]$. The realization yields trial estimates for the relative arrival times in the ACF, $$t_j[2]-t_j[1]=\Delta_{jj}[l(1)]$$

$$t_j[3]-t_j[1]=\Delta_{jj}[l(2)]$$

$$t_j[4]-t_j[1]=\Delta_{jj}[l(3)] \quad (71)$$

etc.

$$t_j[N_j-1]-t_j[1]=\Delta_{jj}[l(N_j-2)].$$

Similarly, for channel k, there are, $$Q_k \equiv \binom{P'_k - 1}{N_k - 2} = \frac{(P'_k - 1)!}{(P'_k - 1 - (N_k - 2))!(N_k - 2)!}, \quad (72)$$

ways to pick $N_k-2$ elements, without replacement, from a set of $P'_k-1$ elements, $$\{\Delta_{kk}[1]\ \Delta_{kk}[2]\ \Delta_{kk}[3]\ \ldots\ \Delta_{kk}[P'_k-1]\}.$$

Each realization yields trial estimates of the positively-lagged peaks in the ACF, $$t_k[2]-t_k[1]=\Delta_{kk}[l'(1)] \quad (73)$$

$$t_k[3]-t_k[1]=\Delta_{kk}[l'(2)]$$

$$t_k[4]-t_k[1]=\Delta_{kk}[l'(3)]$$

etc.

$$t_k[N_k-1]-t_k[1]=\Delta_{kk}[l'(N_k-2)].$$

where $l'(m) \in \{1\ 2\ 3\ \ldots\ P'_k-1\}$ and where $m=1, 2, \ldots N_k-2$

For each realization of relative arrival times for channels j and k, a realization is formed for the lags in the CCF. Since there are $Q_j$ and $Q_k$ realizations of relative times from channels j and k respectively, there are, $$T_{jk} \equiv Q_j Q_k, \quad (74)$$

possible realizations of the lags in the CCF (Table III).

Each realization of the CCF is constructed as follows. Label the peak's lags in the CCF $\delta_{jk}[i]$, $i=1, 2, 3, \ldots M'_{jk}$.

Put them in monotonically increasing order, $\delta_{jk}[i] < \delta_{jk}[i+1]$. Four CCF lags are immediately identifiable. They are, 1. $\delta_{jk}[1]=t_j[1]-t_k[N_k]$, the peak at smallest lag.
2. $\delta_{jk}[M'_{jk}]=t_j[N_j]-t_k[1]$, the peak at greatest lag.
3. $\delta_{jk}[i_1] \equiv t_j[1]-t_k[1]=\delta_{jk}[1]+\Delta_{kk}[P'_k]$ or $\delta_{jk}[M'_{jk}]-\Delta_{jj}[P'_j]$. $\delta_{jk}[1]$ is known from 1 and $\Delta_{jj}[P'_k]$ and $\Delta_{kk}[P'_k]$ are the peaks at greatest lag in channels j and k.
4. $\delta_{jk}[i_2] \equiv t_j[N_j]-t_k[N_k]$ which is formed by adding $\delta_{jk}[1]$ plus $\Delta_{jj}[P'_j]$. $\delta_{jk}[1]$ is obtained from 1 and $\Delta_{jj}[P'_j]$ is the peak with most positive lag in channel j.

Excluding these four lags, we form $N_j-2$ trial lags, $$\tau_{jk}[m, 1]=\delta_{jk}[i_1]+\Delta_{jj}[l(m-1)], m=2, 3, \ldots N_j-1, \quad (75)$$

plus $N_k-2$ trial lags, $$\tau_{jk}[1, m]=\delta_{jk}[i_1]-\Delta_{kk}[l'(m-1)], m=2, 3, \ldots N_k-1, \quad (76)$$

plus $(N_j-2)(N_k-2)$ trial lags, $$\tau_{jk}[m, n]=\delta_{jk}[i_1]+\Delta_{jj}[l(m-1)]-\Delta_{kk}[l'(n-1)], \quad (77)$$

$$m=2, 3, 4, \ldots N_j-1$$

$$n=2, 3, 4, \ldots N_k-1,$$

plus $N_k-2$ trial lags, $$\tau_{jk}[N_j, n]=\delta_{jk}[i_1]+\Delta_{jj}[P'_j]-\Delta_{kk}[l(n-1)], n=2, 3, \ldots N_k-1, \quad (78)$$

plus $N_j-2$ trial lags, $$\tau_{jk}[m, N_k]=\delta_{jk}[i_1]+\Delta_{jj}[l'(m-1)]-\Delta_{kk}[P'_k], m=2, 3, \ldots N_j-1. \quad (79)$$

The realization of trial lags is selected that best fits the measured lags in the CCF.

A cost function which penalizes misfit is given by, $$G \equiv \sum_{p=1}^{M'_{jk}} |\delta_{jk}[p] - \tilde{\tau}_{jk}[p(n)]|, \quad (80)$$

where, for each realization, $\tau_{jk}[p(n)]$ is the lag closest to $\delta_{jk}[p]$. The expected value of the cost function is equal to the sum of the expected misfits of each of the peaks. If the misfits are due to noise, and not loss of coherence, an analytical expression may be obtained for the expected misfit using Eq. 3.17 in chapter 8 of Helstrom (1968).

This method identifies CCF lags using $\delta_{jk}[i_1] \equiv t_j[1]-t_k[1]$ as an anchor point about which other peaks are referenced. The peak in the CCF at $t_j[1]-t_k[1]$ need not even appear in the CCF, because there are independent estimates of its value. More generally, however, it is not required that this particular anchor point be used. The anchor point could be any of the four lags, $\delta_{jk}[1]$, $\delta_{jk}[M'_{jk}]$, $\delta_{jk}[i_1]$, or $\delta_{jk}[i_2]$, since they are identified at the outset.

Other anchor lags may also be used at the price of making additional trials. One might make exhaustive guesses for the identification of a particular CCF peak, and use that guess to anchor the construction of all other trial lags. For example, the first, then second, then third, etc. peak may be guessed to be identified as $t_j[3]-t_k[2]$, and all resulting lags may be constructed from this anchor point. If there are $M'_{jk}$ peaks in the CCF, the resulting number of trial lags to construct is $M'_{jk}T_{jk}$.

C. Example

Figure 7A:
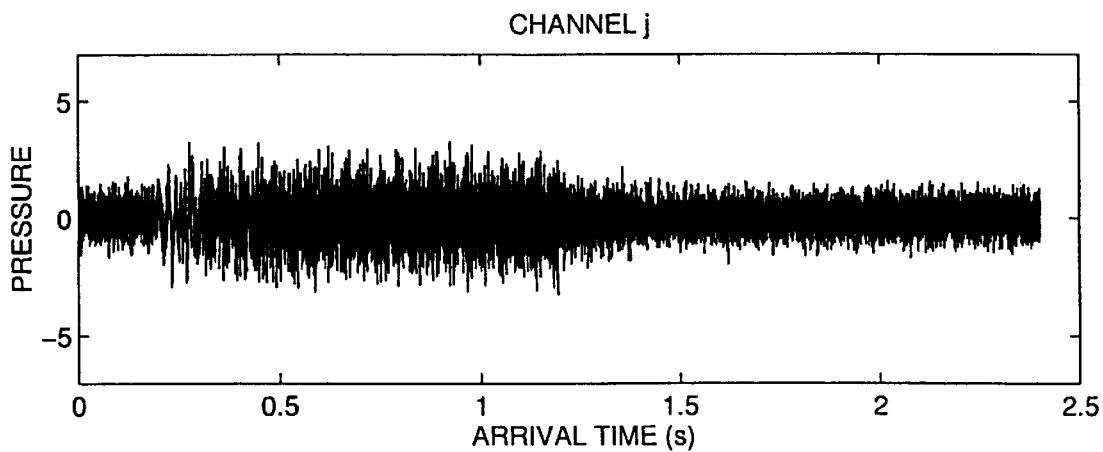
FIG. 7 depicts a simulation of data recorded on channels j and k.
Figure 7B:
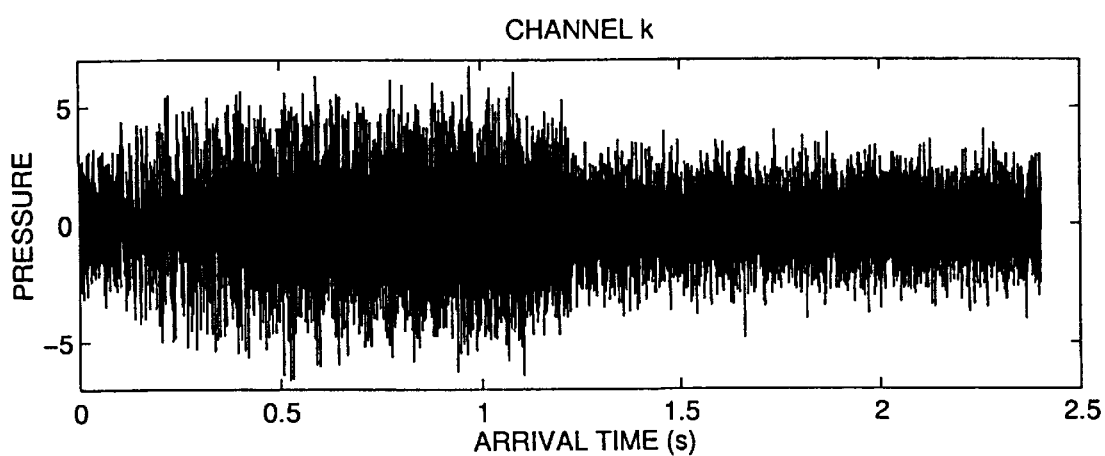

The signal, s(t), is assumed to be a linear FM sweep from 20 to 600 Hz over a 1 s interval. There are four multipaths at channels j and k with arrival times and amplitudes shown in Table VIII. The records at these channels are synthesized so that the signal-to-noise ratio of the first multipath is 3 dB (FIG. 7). The CCF exhibits 15 peaks (FIG. 8) at the lags shown in Table VIII. CCF peaks 1 and 15 are identified by inspection as $t_j[1]-t_k[N_j]$ and $t_j[N_k]-t_k[1]$ as explained in Section VII, with $N_j$ and $N_k$ to be determined. The values of the lags for peaks 1 and 15 are $\tau_{jk}[1, N_k]=-0.2001$ s and $\tau_{jk}[N_j, 1]=+0.2760$ s respectively.

Figure 9A:
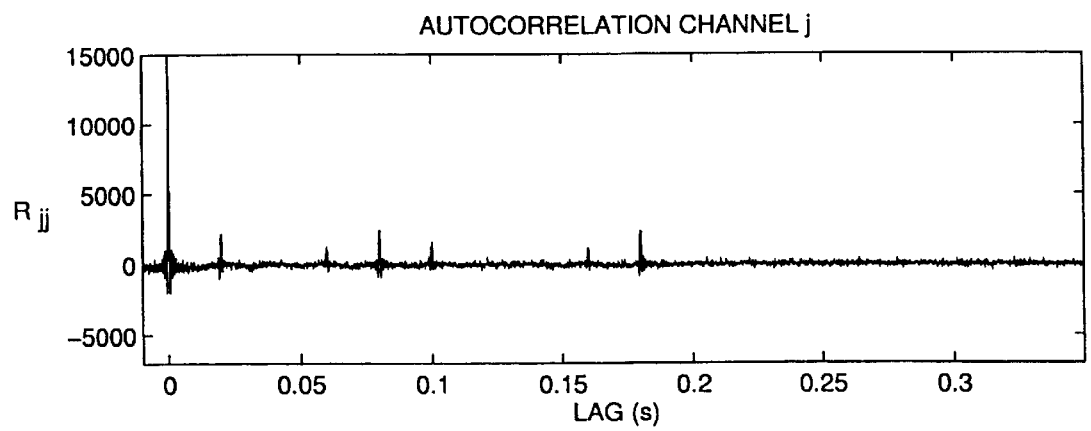
FIG. 9 depicts the autocorrelation functions for channels j and k.
Figure 9B:
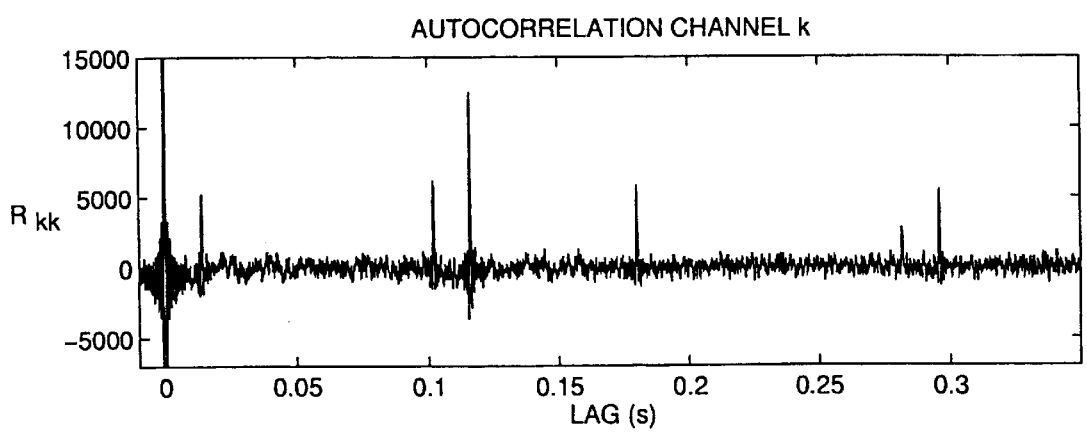
Figure 11:
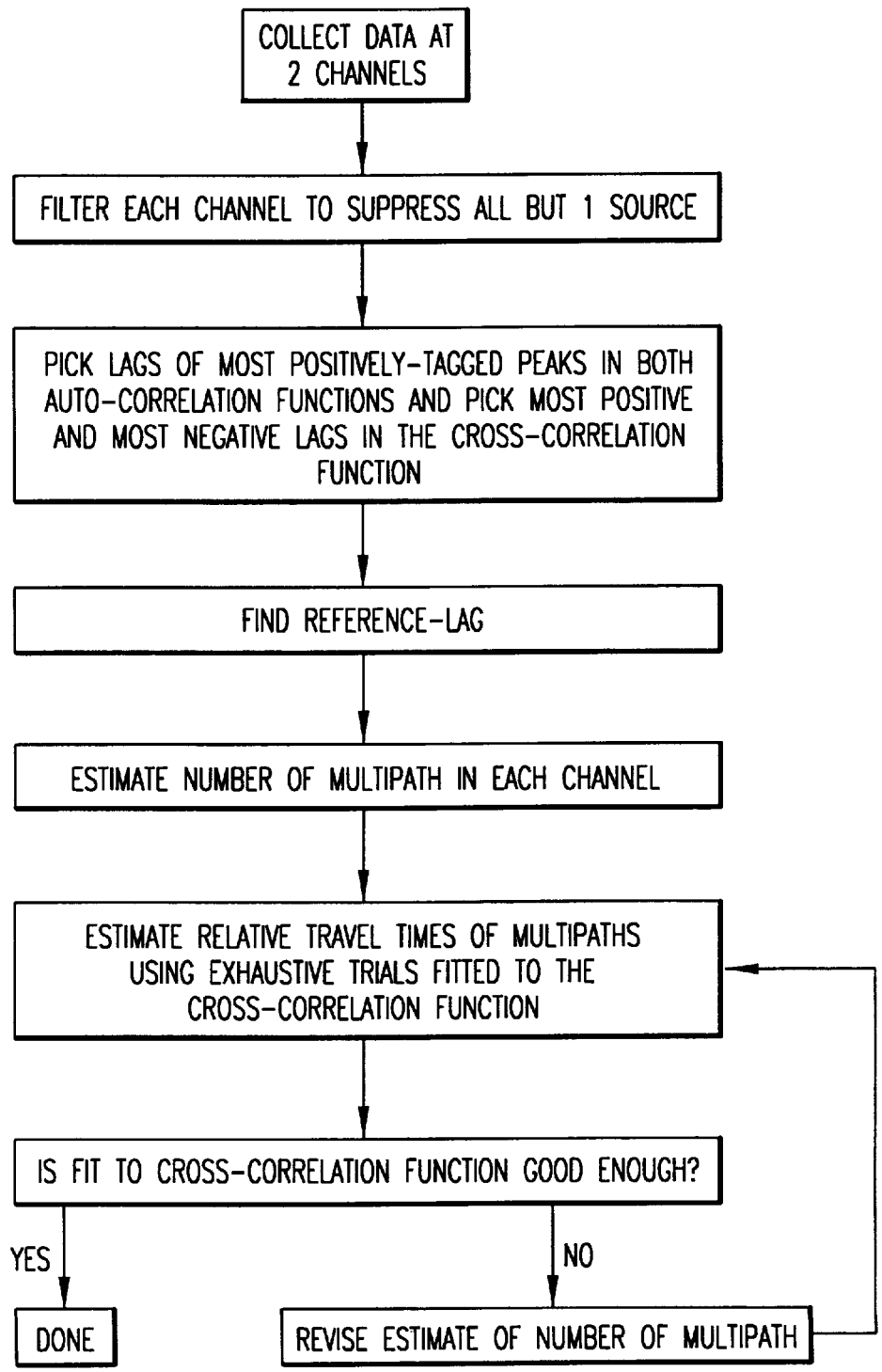
FIGS. 11 and 12 depict the flow charts illustrating the steps of the inventive methods described herein.
Figure 12:
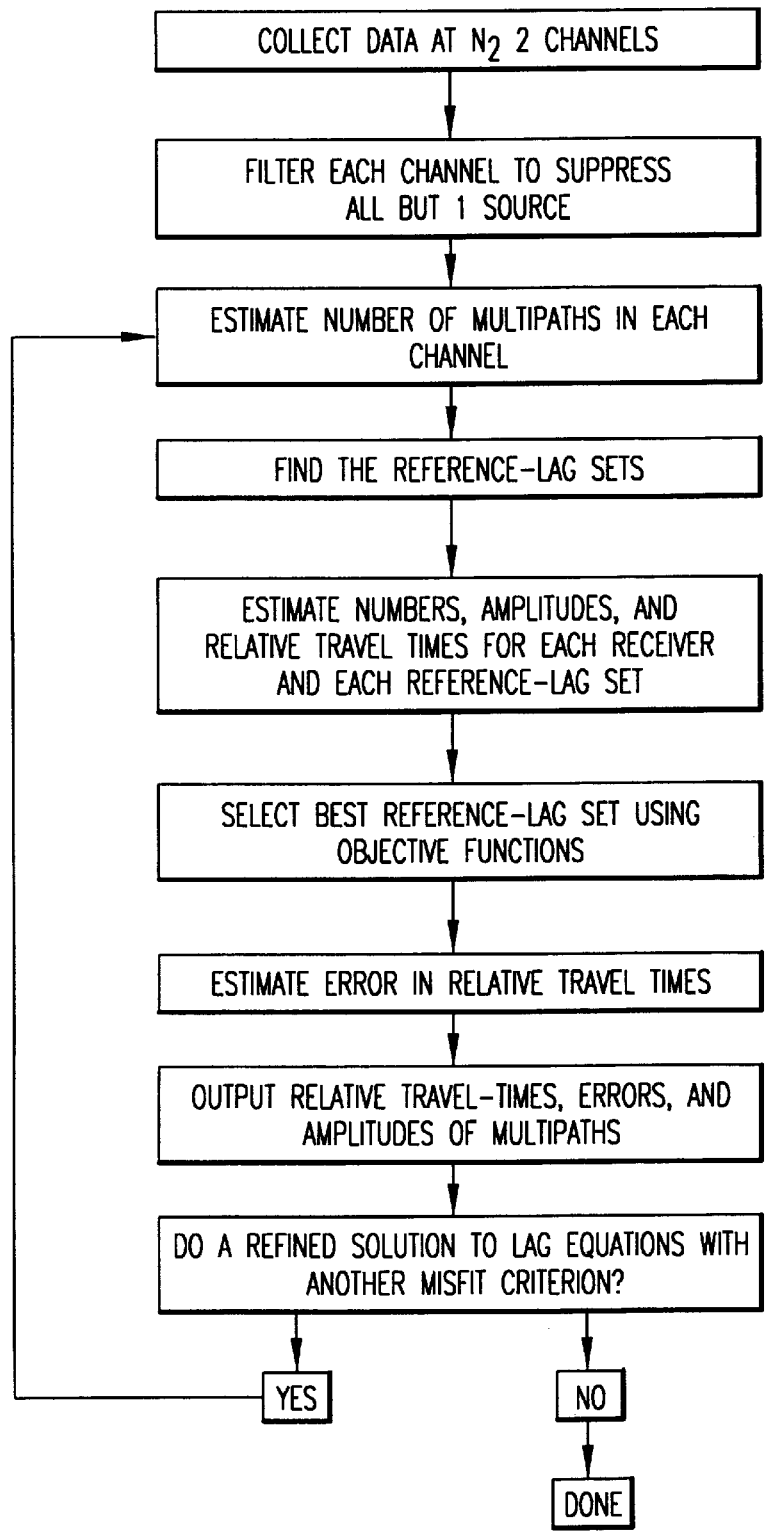

Six positively lagged peaks occur in the ACF's of channels j and k (FIG. 9). Using Eq. (67), we estimate the number of multipaths in each channel to be $N_j=N_k=4$. Note that examination of the raw records does not allow us to estimate the number of multipath which arrive in each channel (FIG. 7), but the correct number is inferred (Table VII). The most positively-lagged peaks in the ACF are identified as $t_j[4]-t_j[1]$ and $t_k[4]-t_k[1]$ with values $\tau_{jj}[N_j, 1]=0.1800$ s and $\tau_{kk}[N_k, 1]=0.2960$ s respectively for channels j and k (Table IX). Eqs. (62) and (63) give two independent estimates for the arrival time difference of the first arrivals, $t_j[1]-t_k[1]$, as, $$\tau_{jk}[1, N_k]+\tau_{kk}[N_k, 1]=+0.0959 \text{ s}$$

$$\tau_{jk}[N_j, 1]-\tau_{jj}[N_j, 1]=+0.0961 \text{ s}, \quad (81)$$

with average value +0.0960 s. Referring to Table VII, we see that the correct answer for $t_j[1]-t_k[1]$ is +0.0960 s without noise. Also note that there is a peak in the CCF at lag +0.0960 s. Thus, $t_j[1]-t_k[1]$ is estimated correctly.

The method in Section VIII is used to estimate the remaining relative arrival time differences in each channel for all possible realizations of the peaks in the CCF. Since $N_j=N_k=4$ and $P_j=P_k=6$, $Q_j=Q_k=10$, there are $T_{jk}=100$ such realizations of the CCF (Table VI). The cost function, G, reaches a distinct minimum equal to 0.00034 s for one realization (FIG. 10). Choosing this minimum case, the relative arrival times of the multipaths in the two channels are determined (Table X). These relative arrival times may be verified by the reader as correct by referring to the arrivals times of the multipaths given in Table VII.

The procedure given in Section VIII correctly identifies the peak in the CCF which consists of two sets of multipaths. At the minimum value of the cost function, it is found that two pairs of arrivals have the same arrival time difference in the CCF equal to −0.0200 s. Referring to Table VII, the first arrival from j minus the third from k gives −0.0200 s. Also, the fourth arrival from j minus the fourth arrival from k gives −0.0200 s.

TABLE VI

The total number of realizations, $T_{jk}$ from (37), of positively lagged peaks in the ACF's of channels j and k that may be constructed to find the best fit to the peak's lags in the CCF. $T_{jk}$ is tabulated for the indicated number of multipath, $N_j$ and $N_k$, assuming there are $P_j$ and $P_k$ positively-lagged peaks in the ACF's. Values are calculated assuming there are no degenerate lags in the ACF's.

| $N_k$ | $N_j = 3$ | 4 | 5 | 6 | 7 | 8 | 9 |
|---|---|---|---|---|---|---|---|
| 3 | 4 | 20 | 168 | 2,002 | 31,008 | 592,020 | 13,449,040 |
| 4 | | 100 | 840 | 10,010 | 188,040 | 2,960,100 | 67,245,200 |
| 5 | | | 7,056 | 84,084 | 1,302,336 | 24,864,840 | 564,859,680 |
| 6 | | | | 1,002,001 | 15,519,504 | 296,306,010 | ~6.7 × 10$^9$ |
| 7 | | | | | 240,374,014 | ~4.6 × 10$^9$ | ~1.0 × 10$^{11}$ |
| 8 | | | | | | ~8.8 × 10$^{10}$ | ~2.0 × 10$^{12}$ |
| 9 | | | | | | | ~4.5 > 10$^{13}$ |

TABLE VII

The arrival times, $t_j[n]$ and $t_k[n]$, and amplitudes, $a_j[n]$ and $a_k[n]$ of the four multipaths at channels j and k respectively.

| Channel j | | Channel k | |
|---|---|---|---|
| $t_j[n]$ (s) | $a_j[n]$ | $t_k[n]$ (s) | $a_k[n]$ |
| 0.200 | 1.0 | 0.104 | 1.5 |
| 0.220 | 0.4 | 0.118 | 0.7 |
| 0.280 | 0.5 | 0.220 | 1.7 |
| 0.380 | 0.5 | 0.400 | 0.7 |

TABLE VIII

Figure 8:
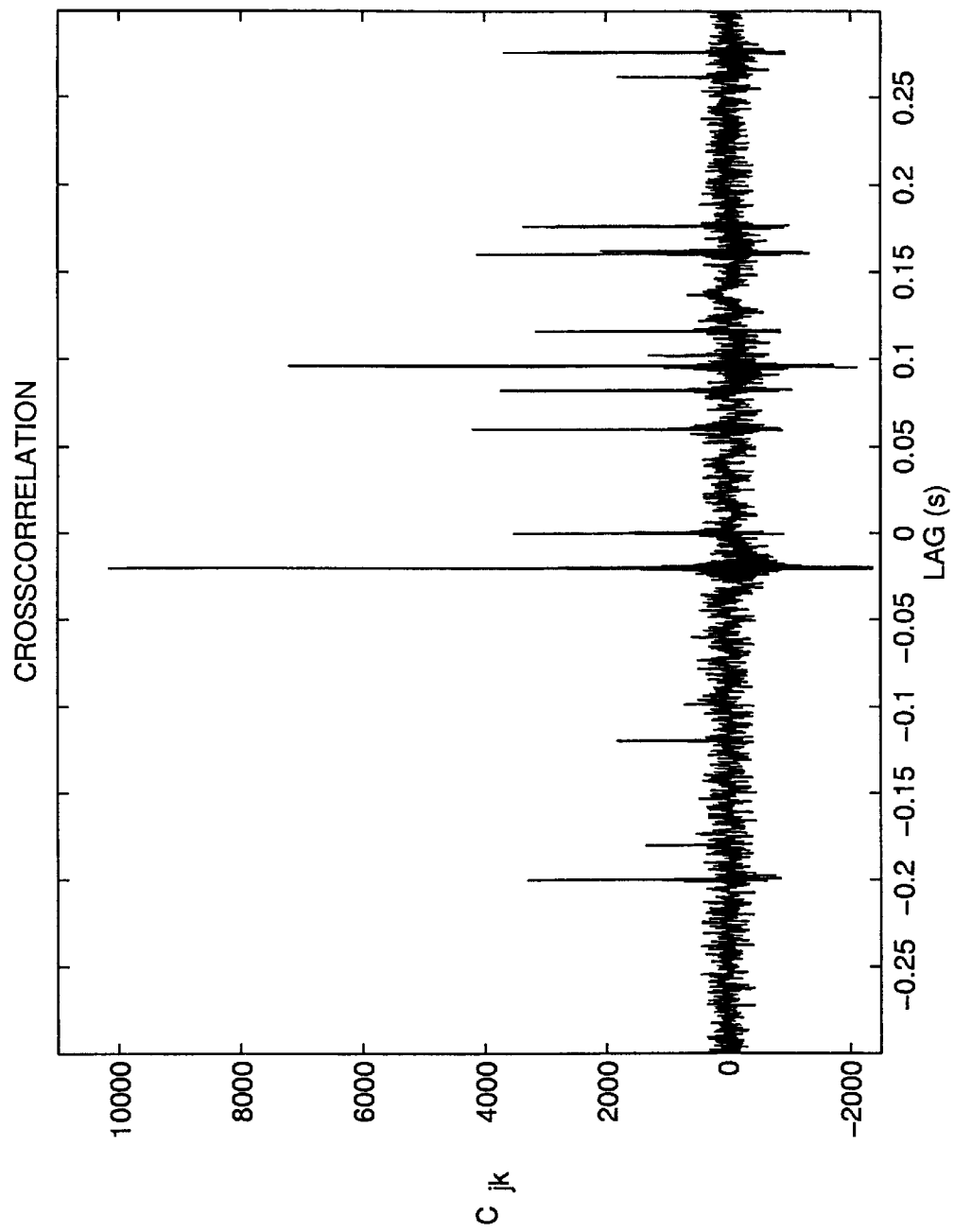
FIG. 8 depicts the cross-correlation function for channels j and k.

The lags of peaks, $\tau_{jk}[n]$, in the crosscorrelation function from channels j and k shown in FIG. 8. Peaks 1 and 15 are identified by inspection. Peaks 4 and 8 are identified by examining the auto-correlation function with the method in Section I.

| CCF Peak # | $\tau_{jk}[n]$ (s) | Identification |
|---|---|---|
| 1 | −0.2001 | $t_j[1] - t_k[4]$ |
| 2 | −0.1800 | |
| 3 | −0.1200 | |
| 4 | −0.0200 | $t_j[4] - t_k[4]$ |
| 5 | +0.0000 | |
| 6 | +0.0600 | |
| 7 | +0.0820 | |
| 8 | +0.0960 | $t_j[1] - t_k[1]$ |
| 9 | +0.1020 | |
| 10 | +0.1160 | |
| 11 | +0.1600 | |
| 12 | +0.1620 | |
| 13 | +0.1760 | |
| 14 | +0.2620 | |
| 15 | +0.2760 | $t_j[4] - t_k[1]$ |

TABLE IX

The lags of peaks in the autocorrelation functions (ACF) for channels j and k shown in FIG. 9. The last peak is identified by inspection using the method in Section VII.

| ACF Peak # | $\Delta_{jj}[n]$ (s) | $\Delta_{kk}[n]$ (s) | Identification |
|---|---|---|---|
| 1 | 0.0200 | 0.0140 | |
| 2 | 0.0600 | 0.1020 | |
| 3 | 0.0800 | 0.1160 | |

TABLE IX-continued

The lags of peaks in the autocorrelation functions (ACF) for channels j and k shown in FIG. 9. The last peak is identified by inspection using the method in Section VII.

| ACF Peak # | $\Delta_{jj}[n]$ (s) | $\Delta_{kk}[n]$ (s) | Identification |
|---|---|---|---|
| 4 | 0.1000 | 0.1800 | |
| 5 | 0.1600 | 0.2820 | |
| 6 | 0.1800 | 0.2960 | $t_j[4] - t_j[1]$ and $t_k[4] - t_k[1]$ |

TABLE X

Reconstruction of the relative arrival times of the four multipaths in channels j and k for FIG. 2 using the method described in Section II.

| Relative Arrival Time Difference | (s) |
|---|---|
| $t_j[2] - t_j[1]$ | 0.0200 |
| $t_j[3] - t_j[1]$ | 0.0800 |
| $t_j[4] - t_j[1]$ | 0.1800 |
| $t_k[2] - t_k[1]$ | 0.0140 |
| $t_k[3] - t_k[1]$ | 0.1160 |
| $t_k[4] - t_k[1]$ | 0.2960 |

VIII. DISCUSSION

The number of different trial lags that may be constructed for the CCF, $T_{jk}$, may grow large for a modest number of multipaths (Table VI). Massively parallel or concurrent computers are ideally suited for checking the trial lags. There may be efficient methods for finding the trial lags which minimize the cost function. This is an open research problem.

The time delays of peaks in the ACF are the key information used to identify peaks in the CCF. Coherence between multipath at one point in space typically exceeds coherence between multipath at two points in space. Thus, multipaths leading to CCF peaks are likely to lead to peaks in their own ACF outputs. Thus, the key ACF information is likely to be available for identifying peaks in the CCF.

If the source is moving with respect to the receivers, the time intervals between multipaths are modified by the relative speeds between the source and each receiver. If the Doppler effect is nearly the same for all multipaths at a receiver, then the methods given in this paper apply as long as (i) cross-correlation is implemented by scanning over all possible Doppler contractions and choosing the crosscorrelation having the largest signal output and (ii) the samples from one receiver are Doppler contracted in time to account for the relative velocity between the source and the other receiver. If the differential Doppler between multipaths at the same receiver is large enough so as to obliterate an otherwise significant peak in the output of the autocorrelation function, then the methods given here may fail.

When one's goal is to estimate the relative arrival times of multipath at a particular receiver and there are R total receivers, there are, $$N_{ccf} = R - 1, \quad (82)$$

different crosscorrelation functions that may be formed to check the results for consistency. For example, if there are five receivers, then CCFs may be formed for receiver pairs 1 and 2, 1 and 3, 1 and 4, and 1 and 5. The method in section II may be applied to each pair. The relative arrival times and amplitudes of multipath at receiver 1 should be consistent for each case. If there is an inconsistency, then it is possible that a CCF lacks sufficient coherence between multipath to yield enough peaks to make a definitive identification of peaks from the respective ACF functions. A democratic solution might be employed when three out of the four possible CCF's yield identical solutions for the travel times and amplitudes at receiver 1.

Appendix D attached hereto is entitled "Passive Acoustic Localization of Calling Animals and Tomography of the Atmosphere: Experimental Demonstration." The Appendix shows applications of the signal processing of the present inventor.

Appendix E attached hereto is entitled "Locating Boundaries with Cross-Correlation Functions and Describes Applications of the Present Invention."

Appendix F is a copy of the source code for the high/low signal noise ratio.

SCOPE

In the foregoing specification, the present invention has been described with reference to specific exemplary embodiments thereof. The invention is considered to have been described in such full, clear, concise and exact terms as to enable a person of ordinary skill in the art to make and use the same. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims, which particularly point out and distinctly claim the subject matter Applicants regard as their invention.

TABLE OF SYMBOLS (For High/Low Signal-To-Noise Ratio Disclosure)

$a_j[n]$ The amplitude of the nth multipath at receiver j $B_{ij}(T)$ The "B-augmented-template correlation function" (B-ATCF) is the cross-correlation between non-negative lags in $\check{R}_{jj}$ and $\check{R}_{ji}$ C An objective function based on the sum of F-augmented-template correlation functions $e_j(t)$ The noise in channel j as a function of time t $F_{ij}(T)$ The "F-augmented-template correlation function" (F-ATCF) is the cross-correlation between non-negative lags in $\check{R}_{ii}$ and $\check{R}_{ij}$ $M_{jk}$ The maximum number of peaks in the cross-correlation function $M'_{jk}$ The number of peaks in the cross-correlation function $N_j$ The number of multipaths at channel j arriving at intervals exceeding the inverse bandwidth of the signal $\hat{N}_j$ The estimated number of multipaths at channel j arriving at intervals exceeding the inverse bandwidth of the signal $P_j$ The maximum number of positively-lagged peaks in the auto-correlation function at receiver j $P'_j$ The number of positively-lagged peaks in the auto-correlation function of channel j $r_j(t)$ The received signal at channel j $\vec{r}$ The residual between the modeled and measured amplitudes of nondegenerate peaks in correlation functions r The length of the residual vector between the modeled and measured amplitudes of nondegenerate peaks in correlation functions R The number of receivers $R_{jk}(\tau)$ The cross-correlation function from receivers j and k as a function of lag $R'_{jk}(\tau)$ The amplitude of the Hilbert transform of the correlation between receivers j and k $\check{R}_{jk}(\tau)$ The occurrence counter for the presence of a peak in a correlation function between receivers j and k s(t) The signal emitted from the animal as a function of time $S_i$ The number of multipaths satisfying the lag-equations at receiver i S The sum number of multipaths satisfying the lag-equations at all receivers $t_j[n]$ The travel-time of the nth multipath at receiver j $\Delta f$ The bandwidth of the signal $\tau_{jk}[n, m]$ The lag in the correlation between channels j and k corresponding to the travel-time of multipath n in channel j minus the travel-time of multipath m in channel k $a_j[n]$ The amplitude of the nth multipath at receiver j $C_{jk}(T)$ The CCF between receivers j and k as a function of lag $e_j(t)$ The noise in channel j as a function of time t $M_{jk}$ The maximum number of peaks in the CCF $M'_{jk}$ The number of peaks in the CCF $N_j$ The number of multipaths at channel j arriving at intervals exceeding the inverse bandwidth of the signal $P_j$ The maximum number of positively-lagged peaks in the ACF at receiver j $P'_j$ The number of positively-lagged peaks in the ACF of channel j $r_j(t)$ The received signal at channel j $Q_j$ the number of lag realizations from channel j $R_{jj}(\tau)$ The autocorrelation function of the received signal at receiver j s(t) The signal emitted from the animal as a function of time $t_j[n]$ The travel time of the nth multipath at receiver j $t_j[n]-t_j[1]$ Trial arrival time differences for channel j The Number of Realizations of CCF Lags that are Constructed from the Positively-lagged Peaks in Channels j and k $U_j$ The number of degeneracies in the positively-lagged peaks in the ACF of channel j. A degeneracy occurs when two pairs of multipaths have unresolved arrival times in the output of the ACF $\delta_{jk}[n]$ The lags of the peaks in the CCF between channels j and k listed in monotonically increasing order $\delta_{jk}[i_1]$ The ordered lag in the CCF corresponding to $t_j[1]-t_k[1]$ $\delta_{jk}[i_2]$ The ordered lag in the CCF corresponding to $t_j[N_j]-t_k[N_k]$ $\Delta_{jj}[n]$ The lags of the positively-lagged peaks in the ACF of channel j listed in monotonically increasing order $\Delta f$ The bandwidth of the signal $\tau_{jj}[n, m]$ The lag in the ACF of channel j corresponding to the arrival time of multipath n minus multipath m $\tau_{jk}[n, m]$ The lag in the CCF between channels j and k corresponding to the arrival time of multipath n in channel j minus the arrival time of multipath m in channel k $\tau'_{jk}[n, m]$ Trial lag for $\tau_{jk}[n, m]$

What is claimed is:

1. A method of localizing signals comprising the steps of:
   collecting data at a plurality of input channels;
   filtering said data collected from said plurality of input channels in order to identify a primary signal
   identifying at least two lags in a function of said data; and
   estimating relative travel times of said data utilizing said lags.

2. The method of claim 1 wherein said at least two lags are both positive.

3. The method of claim 1 wherein said at least two lags are both negative.

4. The method of claim 1 wherein said at least two lags includes a positive lag and negative lag.

5. The method of claim 1 wherein at least two auto-correlation functions and at least one cross-correlation function is utilized in order to identify said at least two lags.

6. The method of claim 5 further comprising the step of locating the source of said primary signal.

7. A method of locating signals comprising of the steps of:
   collecting multipath signals at a plurality of input channels;
   filtering said multipath signals collected from said plurality of input channels in order to identify a primary signal;
   utilizing an auto-correlation function and cross-correlation function of said multipath signals in order to identify a plurality of lags;
   identifying a lag in said auto-correlation function and in said cross-correlation function of said multipath signals;
   estimating a total number of multipath signals received in said plurality of input channels; and
   estimating relative travel times of said multipath signals utilizing said lags in said auto and cross correlation functions.

8. The method of claim 7 further comprising the step of locating the source of said primary signal.

9. A method of locating a source of primary signal comprising the steps of:
   collecting multipath signals at a first input channel and a second input channel;
   filtering said multipath signals collected from said first and second input channels in order to identify said primary signal;
   utilizing an auto-correlation function to identify at least one auto-correlation positive lag in said multipath signals;
   utilizing a cross-correlation function to identify at least one lag in said multipath signals;
   identifying a lag in said auto-correlation function and a reference lag in said cross-correlation function of said multipath signals;
   estimating a total number of multipath signals received in said first input channel;
   estimating a total number of multipath signals received in said second input channel;
   estimating relative travel times of said multipath signals utilizing said lags; and
   determining the location of said primary signal based upon the relative travel times of said multipath signals.

10. A method of locating a source of primary signal comprising the steps of:
    collecting multipath signals at a plurality of input channels;
    filtering said multipath signals collected from said plurality of input channels in order to identify said primary signal;
    estimating a total quantity of said multipath signals collected from each of said plurality of i input channels;
    identifying a plurality of reference lags in said multipath signals;

estimating amplitudes and relative travel times of said primary signal to each of said plurality of input channels;

selecting a primary reference lag from said plurality of reference lags; and estimating errors in said relative travel times based upon said primary reference lag.

11. The method of claim 10 further comprising the step of locating the source of said primary signal and error of source position.

12. The method of claim 11 further comprising the step of estimating at least one acoustical reflection point based upon said relative travel times.

* * * * *